(12) United States Patent
Guillou et al.

(10) Patent No.: US 7,266,197 B1
(45) Date of Patent: Sep. 4, 2007

(54) METHOD, SYSTEM, DEVICE FOR PROVING THE AUTHENTICITY OF AN ENTITY AND/OR THE INTEGRITY AND/OR THE AUTHENTICITY OF A MESSAGE USING SPECIFIC PRIME FACTORS

(75) Inventors: Louis Guillou, Bourgbarre (FR); Jean-Jacques Quisquater, Rhode Saint Genese (BE)

(73) Assignees: France Telcom, Paris (FR); TDF, Paris Cedex (FR); Math Rizk, Louvain-La-Neuve (BE)

( * ) Notice: Subject to any disclaimer, the term of this patent is extended or adjusted under 35 U.S.C. 154(b) by 0 days.

(21) Appl. No.: 09/869,966

(22) PCT Filed: Jan. 27, 2000

(86) PCT No.: PCT/FR00/00189

§ 371 (c)(1),
(2), (4) Date: Sep. 14, 2001

(87) PCT Pub. No.: WO00/46947

PCT Pub. Date: Aug. 10, 2000

(30) Foreign Application Priority Data

| Jan. 27, 1999 | (FR) | 99 01065 |
| Mar. 23, 1999 | (FR) | 99 03770 |
| Oct. 1, 1999 | (FR) | 99 12465 |
| Oct. 1, 1999 | (FR) | 99 12467 |
| Oct. 1, 1999 | (FR) | 99 12468 |

(51) Int. Cl.
*H04L 9/00* (2006.01)
*H04K 1/00* (2006.01)
*H04L 9/30* (2006.01)

(52) U.S. Cl. ............ 380/44; 380/30; 380/273; 713/168; 713/169; 713/174; 713/175

(58) Field of Classification Search ........... 713/170, 713/175, 169, 174, 168; 380/30, 44, 273
See application file for complete search history.

(56) References Cited

U.S. PATENT DOCUMENTS 5,140,634 A * 8/1992 Guillou et al. ............ 713/180

(Continued)

FOREIGN PATENT DOCUMENTS

EP 311 470 4/1989

(Continued)

OTHER PUBLICATIONS

Guillou, Louis C. et al. "Cryptographic authentication protocols for smart cards", 2001 Computer Networks.*

(Continued)

*Primary Examiner*—Kambiz Zand
*Assistant Examiner*—Michael J. Simitoski
(74) *Attorney, Agent, or Firm*—Westman, Champlin & Kelly

(57) ABSTRACT

The proof is provided by means of the following parameters: a public module n formed by the product of f prime factors $p_i$, $f>2$; a public superscript v; m base numbers $g_i$, $m>1$. The base numbers $g_i$ are such that the two equations: $x^2 \equiv g_i$ mod n and $x^2 \equiv -g_i$ mod n cannot de solved in x in the ring of integers modulo n, and such that the equation $x^v \equiv g_i^2$ mod n can be solved in x in the ring of integers modulo n in the case where the public superscript v is in the form $v=2^k$, wherein k is a security parameter.

12 Claims, 4 Drawing Sheets

U.S. PATENT DOCUMENTS

| | | | | |
|---|---|---|---|---|
| 5,218,637 A | * | 6/1993 | Angebaud et al. | 713/173 |
| 5,604,805 A | * | 2/1997 | Brands | 380/30 |
| 6,389,136 B1 | * | 5/2002 | Young et al. | 380/28 |
| 6,697,946 B1 | * | 2/2004 | Miyaji | 713/180 |

FOREIGN PATENT DOCUMENTS

| | | |
|---|---|---|
| EP | 381 523 | 8/1990 |
| EP | 792 044 | 8/1997 |
| EP | 792044 A2 * | 8/1997 |
| WO | WO 89/11706 | 11/1989 |
| WO | WO 96/33567 | 10/1996 |

OTHER PUBLICATIONS

Guillou, Louis C. et al. "A practical zero-knowledge protocol fitted to security microprocessor minimizing both transmission and memory," 1988 Eurocrypt '88.*

Guillou, Louis C. et al. "A "paradoxical" identity-based signature scheme resulting from zero-knowledge", 1988 Crypto '88.*

Guillou, Louis. "Dynamic Authentication of Smart Cards without Crypto-Processor", Nov. 2002.*

Schneier, Bruce. Applied Cryptography, Second Edition, 1996 John Wiley & Sons, Inc., pp. 151-155.*

Vedder, Klaus et al. "A signature with shared verification scheme", 1989.*

IBM. "Asymmetric Authentication Protocol", IBM Technical Disclosure Bulletin vol. 36 No. 10 Oct. 1993, pp. 413-416.*

Menezes, Alfred J. et al. Handbook of Applied Cryptography, 1997 CRC Press LLC, pp. 286-294, 307-311, 412-414 & 450-451.*

Ohta, Kazuo et al. "A modification of the Fiat-Shamir scheme". In Advances in CryptologyCrypto '88, LNCS 0403, pp. 232-243, Springer- Verlag, 1990.*

Okamoto, Tatsuaki, "Provably Secure and Practical Identification Schemes and Corresponding Signature Schemes," Proceedings of CRYPTO'92, pp. 31-53, 1993.*

\* cited by examiner

METHOD, SYSTEM, DEVICE FOR PROVING THE AUTHENTICITY OF AN ENTITY AND/OR THE INTEGRITY AND/OR THE AUTHENTICITY OF A MESSAGE USING SPECIFIC PRIME FACTORS

BACKGROUND OF THE INVENTION

The present invention relates to the technical field of methods, systems and devices designed to prove the authenticity of an entity and/or the integrity and/or authenticity of a message.

The patent EP 0 311 470 B1, whose inventors are Louis Guillou and Jean-Jacques Quisquater, describes such a method. Hereinafter, reference shall be made to their work by the terms "GQ patent" or "GQ method". Hereinafter, the expression "GQ2", or "GQ2 invention" or "GQ2 technology" shall be used to describe the new developments of the GQ technology that are the object of pending applications filed on the same day as the present application by France Telecom, TDF and the firm Mathrizk, and having Louis Guillou and Jean-Jacques Quisquater as their inventors. The characteristic features of these pending applications are recalled whenever necessary in the following description.

According to the GQ method, an entity known as a "trusted authority" assigns an identity to each entity called a "witness" and computes its RSA signature. In a customizing process, the trusted authority gives the witness an identity and signature. Thereafter, the witness declares the following: "Here is my identity; I knew the RSA signature thereof". The witness, without revealing the fact, proves that he knows the RSA signature of his identity. Through the RSA public identification key distributed by the trusted authority, an entity known as a "controller" ascertains, without obtaining knowledge thereof, that the RSA signature corresponds to the declared identity. The mechanism using the GQ method takes place "without transfer of knowledge". According to the GQ method, the witness does not know the RSA private key with which the trusted authority signs a large number of identities.

The GQ technology described here above makes use of RSA technology. However, while the RSA technology truly depends on the factorization of the modulus n, this dependence is not an equivalence, indeed far from it, as can be seen in the so-called multiplicative attacks against various standards of digital signatures implementing the RSA technology.

The goal of the GQ2 technology is twofold: firstly to improve the performance characteristics of RSA technology and secondly to avert the problems inherent in RSA technology. Knowledge of the GQ2 private key is equivalent to knowledge of the factorization of the modulus n. Any attack on the triplets GQ2 leads to the factorization of the modulus n: this time there is equivalence. With the GQ2 technology, the work load is reduced for the signing or self-authenticating entity and for the controlling entity. Through a better use of the problem of factorizing in terms of both security and performance, the GQ2 technology averts the drawbacks of RSA technology.

The GQ method implements modulo computations of numbers comprising 512 bits or more. These computations relate to numbers having substantially the same size raised to powers of the order of $2^{16}+1$. Now, existing microelectronic infrastructures, especially in the field of bank cards, make use of monolithic self-programmable microprocessors without arithmetical coprocessors. The work load related to multiple arithmetical applications involved in methods such as the GQ method leads to computation times which, in certain cases, prove to be disadvantageous for consumers using bank cards to pay for their purchases. It may be recalled here that, in seeking to increase the security of payment cards, the banking authorities have raised a problem that is particularly difficult to resolve. Indeed, two apparently contradictory questions have to be resolved: on the one hand, increasing safety by using increasingly lengthy and distinct keys for each card while, on the other hand, preventing the work load from leading to excessive computation times for the user. This problem becomes especially acute inasmuch as it is also necessary to take account of the existing infrastructure and the existing microprocessor components.

SUMMARY OF THE INVENTION

The GQ2 technology provides a solution to this problem while boosting security.

The GQ2 technology implements prime factors having special properties. There are various existing techniques for producing these prime factors. An object of the present invention is a method for the systematic production of such prime factors. It also relates to the application that can be made of these factors especially in the implementation of the GQ2 technology. It must be emphasized right now that these special prime factors and the method used to obtain them can be applied beyond the field of GQ2 technology.

The invention can be applied to a method (GQ2 method) designed to prove the following to a controller entity:
  the authenticity of an entity and/or
  the integrity of a message M associated with this entity.

This proof is established by means of all or part of the following parameters or derivatives thereof:
  a public modulus n constituted by the product of f prime factors $p_1, p_2, \ldots p_f$ (f being equal to or greater than 2),
  a public exponent v;
  m distinct integer base numbers $g_1, g_2, \ldots g_m$ (m being greater than or equal to 1).

The base numbers $g_i$ are such that the two equations (1) and (2):

$$x^2 \equiv g_i \bmod n \text{ and } x^2 \equiv -g_i \bmod n$$

cannot be resolved in x in a ring of integers modulo n, and such that the equation (3):

$$x^v \equiv g_i^2 \bmod n$$

can be resolved in x in the ring of integers modulo n.

The method according to the invention is used to produce the f prime factors $p_1, p_2, \ldots p_f$ in such a way that the equations (1), (2) and (3) are satisfied. The method according to the invention comprises the step of choosing firstly:
  the m base numbers $g_1, g_2, \ldots g_m$,
  the size of the modulus n,
  the size of the f prime factors $p_1, p_2, \ldots p_f$.

The method relates to the case where the public exponent v has the form:

$$v = 2^k$$

where k is a security parameter greater than 1. The security parameter k is also chosen as a prime number. This special value of the exponent v is one of the essential features of GQ2 technology.

Preferably, the m base numbers $g_1, g_2, \ldots g_m$, are chosen at least partially among the first integers. Preferably again, the security parameter k is a small integer, especially below 100. Advantageously, the size of the modulus n is greater than several hundreds of bits. Advantageously again, the f prime factors $p_1, p_2, \ldots p_f$ have a size close to the size of the modulus n divided by the number f of factors.

According to a major characteristic of the method according to the invention, the f prime factors $p_1, p_2, \ldots p_f$ are not chosen in any unspecified way. Among the f prime factors $p_1, p_2, \ldots p_f$, a certain number of them: e will be chosen to be congruent to 1 modulo 4. This number e of prime factors may be zero. Should e be zero, the modulus n will hereinafter be called a basic modulus. Should e>0, the modulus n will hereinafter be called a combined modulus. The f−e other prime factors are chosen to be congruent to 3 modulo 4. This number f−e of prime factors is at least equal to 2.

Choice of f−e Prime Factors Congruent to 3 Modulo 4

To produce the f−e prime factors $p_1, p_2, \ldots p_{f-e}$ congruent to 3 modulo 4, the following steps are implemented:

the first prime factor $p_1$ congruent to 3 modulo 4 is chosen and then, the second prime factor $p_2$ is chosen such that $p_2$ is complementary to $p_1$ with respect to the base number $g_1$.

To choose the factor $p_{i+1}$, the following procedure is used in distinguishing two cases:

(1) the case where i>m

Should i>m, the factor $p_{i+1}$ congruent to 3 modulo 4 is chosen.

(2) Case where i≦m

Should i≦m, the Profile ($Profile_i(g_i)$) of $g_i$ with respect to i first prime factors $p_i$ is computed:

if the $Profile_i(g_i)$ is flat, the factor $p_{i+1}$ is chosen such that $p_{i+1}$ is complementary to $p_1$ with respect to $g_i$, else, among the i−1 base numbers $g_1, g_2, \ldots g_{i-1}$ and all their multiplicative combinations, the number, hereinafter called g is chosen such that $Profile_i(g)=Profile_i(g_i)$, and then $p_{i+1}$ is chosen such that $Profile_{i+1}(g_i) \neq Profile_{i+1}(g)$.

The terms "complementary", "profile", "flat profile" have the meanings defined in the description.

To choose the last prime factor $p_{f-e}$, the following procedure is used in distinguishing three cases:

(1) Case where f−e−1>m

Should f−e−1>m, $p_{f-e}$ is chosen congruent to 3 modulo 4.

(2) Case where f−e−1=m

Should f−e−1=m, $Profile_{f-e-1}(g_m)$ is computed with respect to f−e−1 first prime factors from $p_1$ to $p_{f-e-1}$, if $Profile_{f-e-1}(g_m)$ is flat, $p_{f-e-1}$ is chosen such that it is complementary to $p_1$ with respect to $g_m$, else, the procedure stipulated here below is followed:

Among the m−1 base numbers from $g_1$ to $g_{m-1}$ and all their multiplicative combinations, the number hereinafter called g is chosen such that $Profile_i(g)=Profile_i(g_i)$ and then $p_{f-e}$ is chosen such that $Profile_{f-e}(g) \neq Profile_{f-e}(g_m)$.

(3) Case where f−e−1<m

If f−e−1<m, then $p_{f-e}$ is chosen such that the following two conditions are met:

(3.1) First Condition $Profile_{f-e-1}(g_{f-e-1})$ is computed with respect to the f−e−1 first prime factors from $p_1$ to $p_{f-e-1}$. Two cases are then to be considered. Depending on either of these two cases, the first condition will be different.

If $Profile_{f-e-1}(g_{f-e-1})$ is flat, $p_{f-e}$ is chosen so that it meets the first condition of being complementary to $p_1$ with respect to $g_{f-e-1}$ (first condition according to the first case). Else, among the f−e−1 base numbers from $g_1$ to $g_{m-1}$ and all their multiplicative combinations, the number, hereinafter called g, is chosen such that $Profile_i(g)=Profile_{f-e-1}(g_{f-e-1})$ and then $p_{f-e}$ is chosen so that it meets the condition of being such that $Profile_{f-e}(g) \neq Profile_{f-e}(g_m)$, (first condition according to the second case).

(3.2) Second Condition

Among all the last base numbers from $g_{f-e}$ to $g_m$, those numbers whose Profile $Profile_{f-e-1}(g_i)$ is flat are chosen and then $p_{f-e}$ is chosen so that it meets the condition of being complementary to $p_1$ with respect to each of the base numbers thus selected (second condition).

Choice of e Prime Factors Congruent to 1 Modulo 4

To produce the e prime factors congruent to 1 modulo 4, each prime factor candidate p is evaluated, from $p_{f-e}$ to $p_f$, in being subjected to the following two successive tests:

(1) First Test

The Legendre symbol is computed for each base number $g_i$, from $g_1$ to $g_m$, with respect to the candidate prime factor p, if the Legendre symbol is equal to −1, the candidate p is rejected, if the Legendre symbol is equal to +1, the evaluation of the candidate p is continued in passing to the following base number and then, when the last base number has been taken into account, there is a passage to the second test.

(2) Second Test

An integer number t is computed such that p−1 is divisible by $2^t$, but not by $2^{t+1}$, then an integer s is computed such that $s=(p-1+2^t)/2^{t+1}$.

The key (s, p) is applied to each public value $G_i$ to obtain a result r $$r \equiv G_i^s \bmod p$$

If r is equal to $g_i$ or $-g_i$, the second test is continued in passing to the following public value $G_{i+1}$.

If r is different from $g_i$ or $-g_i$, a factor u is computed in applying the following algorithm specified for an index ii ranging from 1 to t−2. The algorithm implements two variables: w initialized by r and $jj=2^{ii}$ assuming values ranging from 2 to $2^{t-2}$, as well a number b obtained by application of the key $((p-1)/2^t, p)$ to a non-quadratic residue of CG(p). The algorithm consists in repeating the following sequence as many times as is necessary:

Step 1: $w^2/G_i$ (mod p) is computed,

Step 2: the result is raised to the power of $2^{t-ii-1}$. Two cases are to be considered.

First Case

If +1 is obtained, there is a passage to the following public value $G_{i+1}$ and the second test is performed for this public value.

Second Case

If −1 is obtained, $jj=2^{ii}$ is computed and then w is replaced by $w.b^{jj}$ (mod p). Then, the algorithm is continued for the following value having an index ii.

At the end of the algorithm, the value in the variable jj is used to compute an integer u by the relation $jj=2^{t-u}$ and then the expression t−u is computed. Two cases arise:

if t−u<k, the candidate p is rejected if t−u>k, the evaluation of the candidate p is continued in passing to the following public value $G_{i+1}$ and then in continuing the second test.

The candidate p is accepted as a prime factor congruent to 1 modulo 4 if, at the end of the second test, for all the m public values $G_i$, it has not been rejected.

Application to the Public and Private Values of GQ2

The present invention also relates to a method (GQ2 method) applying the method that has just been described and making it possible, it may be recalled, to produce f prime factors $p_1, p_2, \ldots p_f$ having special properties; The method for the application of the method that has just been described is designed to prove the following to a controller entity, the authenticity of an entity and/or
the integrity of a message M associated with this entity, This proof is established by means of all or part of the following parameters or derivatives of these parameters:

m pairs of private values $Q_1, Q_2, \ldots Q_m$ and public values $G_1, G_2, \ldots G_m$ (m being greater than or equal to 1),
the public modulus n constituted by the product of said prime factors f $p_1, p_2, \ldots p_f$ (f being greater than or equal to 2),
the public exponent v.

Said modulus, said exponent and said values are linked by relations of the following type:

$$G_i.Q_i^v \equiv 1. \bmod n \text{ or } G_i \equiv Q_i^v \bmod n.$$

Said exponent v is such that $$v=2^k$$

where k is a security parameter greater than 1.

Said public value $G_i$ is the square $g_i^2$ of the base number $g_i$ smaller than the f prime factors $p_1, p_2, \ldots p_f$. The base number $g_i$ is such that the two equations:

$$x^2 \equiv g_i \bmod n \text{ and } x^2 \equiv -g_i^2 \bmod n$$

cannot be resolved in x in the ring of integers modulo n and such that the equation:

$$x^v \equiv g_i^2 \bmod n$$

can be resolved in x in the ring of the integers modulo n.

Said method implements an entity called a witness in the following steps. Said witness entity has f prime factors $p_i$ and/or parameters of the Chinese remainders of the prime factors and/or of the public modulus n and/or the m private values $Q_i$ and/or f.m components $Q_{i,j}(Q_{i,j} \equiv Q_i \bmod p_j)$ of the private values $Q_i$ and of the public exponent v.

The witness computes commitments R in the ring of integers modulo n. Each commitment is computed:

either by performing operations of the type:

$$R \equiv r^v \bmod n$$

where r is a random factor such that 0<r<n, or by performing operations of the type:

$$R_i \equiv r_i^v \bmod p_i$$

where $r_i$ is a random value associated with the prime number $p_i$ such that $0<r_i<p_i$, each $r_i$ belonging to a collection of random factors $\{r_1, r_2, \ldots r_f\}$, then by applying the Chinese remainder method.

The witness receives one or more challenges d. Each challenge d comprises m integers $d_i$ hereinafter called elementary challenges. The witness, on the basis of each challenge d, computes a response D, either by performing operations of the type:

$$D \equiv r.Q_1^{d1}.Q_2^{d2}. \ldots . Q_m^{dm} \bmod n$$

or by performing operations of the type:

$$D_i \equiv r_i.Q_{i,1}^{d1}.Q_{i,2}^{d2}. \ldots . Q_{i,m}^{dm} \bmod p_i$$

and then by applying the Chinese remainder method.

The method is such that there are as many responses D as there are challenges d as there are commitments R, each group of numbers R, d, D forming a triplet referenced {R, d, D}.

Preferably, in order to implement the pairs of private values $Q_1, Q_2, \ldots Q_m$ and public values $G_1, G_2, \ldots G_m$ as just described, the method uses the prime factors $p_1, p_2, \ldots p_f$ and/or the parameters of the Chinese remainders, the base numbers $g_1, g_2, \ldots g_m$ and/or the public values $G_1, G_2, \ldots G_m$ to compute:

either the private values $Q_1, Q_2, \ldots Q_m$ by extracting a k-th square root modulo n of $G_i$, or by taking the inverse of a k-th square root modulo n of $G_i$,
or the f.m private components $Q_{i,j}$ of the private values $Q_1, Q_2, \ldots Q_m$ such that $Q_{i,j} \equiv Q_i \pmod{p_j}$.

More particularly, to compute the f.m private components $Q_{i,j}$ of the private values $Q_1, Q_2, \ldots Q_m$:

the key (s, $p_j$) is applied to compute z such that:

$$z \equiv G_i^s \pmod{p_j}$$

and the values t and u are used.

The values t and u are computed as indicated here above when $p_j$ is congruent to 1 modulo 4. The values t and u are taken to be respectively equal to 1 (t=1) and 0 (u=0) where $p_j$ is congruent to 3 modulo 4.

If the value u is zero, we consider all the numbers zz such that:

zz is equal to z or such that
zz is equal to a product (mod $p_j$) of z by each of the $2^{ii-t}$ $2^{ii}$-th primitive roots of unity, ii ranging from 1 to min(k,t).

If u is positive, we can consider all the numbers zz such that zz is equal to the product (mod $p_j$) of za by each of the $2^k$ $2^k$-th roots of unity, za designating the value of the variable w at the end of the algorithm described here above.

At least one value of the component $Q_{i,j}$ is deduced therefrom. It is equal to zz when the equation $G_i \equiv Q_i^v \bmod n$ is used or else it is equal to the inverse of zz modulo $p_j$ of zz when the equation $G_i.Q_i^v \equiv 1. \bmod n$ is used.

DETAILED DESCRIPTION OF THE INVENTION

Figure 1A:
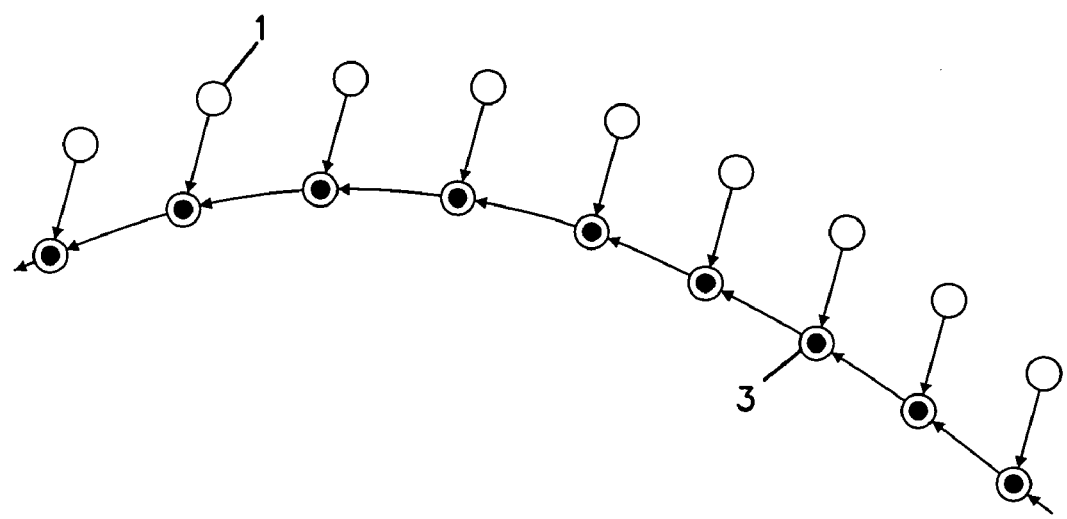
FIG. 1A shows the function "raise to the square in CG(p)" by an oriented graph in the case where p is congruent to 3 (mod 4).

The goal of GQ technology may be recalled: it is the dynamic authentication of entities and associated messages as well as the digital signature of messages.

The standard version of GQ technology makes use of RSA technology. However, although the RSA technology truly depends on factorizing, this dependence is not an equivalence, far from it, as can be shown from attacks, known as multiplicative attacks, against various digital signature standards implementing RSA technology.

In the context of GQ2 technology, the present part of the invention relates more specifically to the production of sets of GQ2 keys designed to provide for dynamic authentication and digital signature. The GQ2 technology does not use RSA technology. The goal is a twofold one: firstly to improve performance with respect to RSA technology and secondly to prevent problems inherent in RSA technology. The GQ2 private key is the factorization of the modulus n. Any attack on the GQ2 triplets amounts to the factorizing of the modulus n: this time there is equivalence. With the GQ2 technology, the work load is reduced both for the entity that signs or is authenticated and for the one that controls. Through an improved use of the problem of factorization, in terms of both security and performance, the GQ2 technology rivals the RSA technology.

The GQ2 technology uses one or more small integers greater than 1 for example m small integers (m≧1) called base numbers and referenced $g_i$. Then, a public verification key (v, n) is chosen as follows. The public verification exponent v is $2^k$ where k is a small integer greater than 1 (k≧2). The public modulus n is the product of at least two prime factors greater than the base numbers, for example f prime factors (f≧2) referenced by $p_j$, from $p_1 \ldots p_f$. The f prime factors are chosen so that the public modulus n has the following properties with respect to each of the m base numbers from $g_1$ to $g_m$.

Firstly, the equations (1) and (2) cannot be resolved in x in the ring of the integers modulo n, that is to say that $g_i$ and $-g_i$ are two non-quadratic residues (mod n).

$$x^2 \equiv g_i \pmod{n} \quad (1)$$

$$x^2 \equiv -g_i \pmod{n} \quad (2)$$

Secondly, the equation (3) can be resolved in x in the ring of the integers modulo n.

$$x^{2^k} \equiv g_i^2 \pmod{n} \quad (3)$$

Hereinafter, these properties are also called the GQ2 principles.

Since the public verification key (v, n) is fixed according to the base numbers from $g_1$ to $g_m$ with m≧1, each base number $g_i$ determines a pair of values GQ2 comprising a public value $G_i$ and a private value $Q_i$: giving m pairs referenced $G_1 Q_1$ to $G_m Q_m$. The public value $G_i$ is the square of the base number $g_i$: giving $G_i = g_i^2$. The private value $Q_i$ is one of the solutions to the equation (3) or else the inverse (mod n) of such a solution.

Just as the modulus n is broken down into f prime factors, the ring of the integers modulo n are broken down into f Galois fields, from $CG(p_1)$ to $CG(p_f)$. Here are the projections of the equations (1), (2) and (3) in $CG(p_j)$.

$$x^2 \equiv g_i \pmod{p_j} \quad (1.a)$$

$$x^2 \equiv -g_i \pmod{p_j} \quad (2.a)$$

$$x^{2^k} \equiv g_i^2 \pmod{p_j} \quad (3.a)$$

Each private value $Q_i$ can be represented uniquely by f private components, one per prime factor: $Q_{i,j} \equiv Q_i \pmod{p_j}$. Each private component $Q_{i,j}$ is a solution to the equation (3.a) or else the inverse (mod $p_j$) of such a solution. After all the possible solutions to each equation (3.a) have been computed, the Chinese remainder technique sets up all the possible values for each private value $Q_i$ on the basis of f components of $Q_{i,1}$ to $Q_{i,f}$: $Q_i$=Chinese remainders $(Q_{i,1}, Q_{i,2}, \ldots Q_{i,f})$ so as to obtain all the possible solutions to the equation (3).

The following is the Chinese remainder technique: let there be two positive integers that are mutually prime numbers a and b such that 0<a<b, and two components $X_a$ from 0 to a−1 and $X_b$ from 0 to b−1. It is required to determine X=Chinese remainders $(X_a, X_b)$, namely the single number X of 0 to a.b−1 such that $X_a \equiv X \pmod{a}$ and $X_b \equiv X \pmod{b}$. The following is the Chinese remainder parameter: $\alpha \equiv \{b \pmod{a}\}^{-1} \pmod{a}$. The following is the Chinese remainder operation: $\epsilon \equiv X_b \pmod{a}$; $\delta = X_a - \epsilon$, if δ is negative, replace δ by δ+a; $\gamma \equiv \alpha.\delta \pmod{a}$; $X = \gamma.b + X_b$.

When the prime factors are arranged in increasing order, from the smallest $p_1$ to the greater $p_f$, the Chinese remainder parameters can be the following (there are f−1, namely at least one of the prime factors). The first Chinese remainder parameter is $\alpha \equiv \{p_2 \pmod{p_1}\}^{-1} \pmod{p_1}$. The second Chinese remainder parameter is $\beta \equiv \{p_1.p_2 \pmod{p_3}\}^{-1} \pmod{p_3}$. The i-th Chinese remainder parameter is $\lambda \equiv \{p_1.p_2 \ldots p_{i-1} \pmod{p_i}\}^{-1} \pmod{p_i}$. And so on and so forth. Finally, in f−1 Chinese remainder operations, a first result (mod $p_2$ times $p_1$) is obtained with the first parameter and then a second result (mod $p_1.p_2$ times $p_3$) with the second parameter and so on and so forth until a result (mod $p_1 \ldots p_{f-1}$ time $p_f$), namely (mod n).

The object of the invention is a method for the random production of any set of GQ2 keys among all the sets possible, namely:

the random production of any moduli among all the GQ2 moduli possible, namely the moduli ensuring that, for each of the m base numbers $g_i$, the equations (1) and (2) cannot be resolved in x in the ring of integers modulo n while the equation (3) has one of them, computing all the possible solutions to each of the equations (3.a). The Chinese remainder technique enables the obtaining of a private value $Q_i$ from each set of f components from $Q_{i,1}$ to $Q_{i,f}$ so as to obtain any solution in x for the equation (3) among all ht possible equations.

$Q_i$=Chinese remainders $(Q_{i,1}, Q_{i,2}, \ldots Q_{i,f})$

To grasp the problem, and then understand the solution to be given to the problem, namely the invention, we shall first of all analyze the applicability of the principles of GQ2 technology. Let us start by recalling the notion of rank in a Galois field CG(p) in order to study the functions "raised to the square in CG(p)" and "take a square root of a quadratic residue in CG(p)". Then, we shall analyze the existence and number of solutions in x in CG(p) to the equations (1.a), (2.a) and (3.a).

Rank of the Elements in CG(p)

Let us take a odd prime number p and a positive prime number a smaller than p. Let us thereafter define {X}.

$\{X\} = \{x_1 = a; \text{ puis, pour } i \geq 1, x_{i+1} \equiv a.x_i \pmod{p}\}$ Let us calculate the term for the index i+p and let us use Fermat's theorem:

$x_{i+p} \equiv a^p.x_i \equiv a.x_i \equiv x_{i+1} \pmod{p}$

Consequently, the period of the sequence {X} is p−1 or a divider of p−1. This period depends on the value of a. By definition, this period is called "the rank of a (mod p)". It is the index of appearance of unity in the sequence {X}.

$$x_{rank(a,p)} \equiv 1 \pmod{p}$$

For example, when (p−1)/2 is an odd prime number p', the Galois field CG(p) comprises a single element with a rank 1: it is 1, a single element with rank 2. It is −1, p'−1 elements of a rank p', p'−1 elements of the rank 2.p', namely of the rank p−1.

The elements of CG(p) whose rank is p−1 are called the primitive elements or again the generators of CG(p). The name is due to the fact that their successive powers in CG(p), namely the terms of the {X} sequence for the indices going from 1 to p−1, form a permutation of all the non-zero elements of CG(p).

According to a primitive element y of CG(p), let us evaluate the rank of the element $y^i$ (mod p) as a function of i and p−1. When i is a prime number with p−1, it is p−1. When i divides p−1, it is (p−1)/i. In all cases, it is (p−1)/pgcd(p−1, i).

The Euler function is referenced by φ. By definition, since n is a positive integer, φ(n) is the number of positive integers smaller than n that are prime numbers with n. In the field CG(p), there are therefore φ(p−1) primitive elements.

By way of an illustration, here is the base of the RSA technology. The public modulus n is the product of f prime factors from $p_1$ to $p_f$ with f≧2, such that for each prime factor $p_j$, the public exponent v is a prime number with $p_j-1$. The key (v, $p_j$) complies with the rank of the elements of CG($p_j$): it permutates them. The inverse permutation is obtained with a key ($s_j$, $p_j$) such that $p_j-1$ divides $v.s_j-1$.

Squares and Square Roots in CG(p)

The elements x and p−x have the same square in CG(p). The key (2, p) do not permutate the elements of CG(p) because p−1 is an even value. For each prime number p, let us define an integer t as follows: p−1 is divisible by $2^t$, but not by $2^{t+1}$, namely p is congruent to $2^t+1$ (mod $2^{t+1}$). For example t=1 when p is congruent to 3 (mod 4); t=2 when p is congruent to 5 (mod 8); t=3 when p is congruent to 9 (mod 16); t=4 when p is congruent to 17 (mod 32); and so on and so forth. Each odd prime number is seen in one and only one category: p is seen in the t-th category. In practice, if we consider a fairly large number of successive prime numbers, about one in every two is found in the first category, one in four in the second, one in eight in the third, one in sixteen in the fourth, and so on and so forth. In short, one in $2^t$ on an average is found in the t-th category.

Let us consider the behavior of the function "raise to the square in CG(p)" according to the parity of the rank of the argument.

There is only one fixed element: it is 1. The square of any other element of an odd-parity rank is another element having the same rank. Consequently, the key (2, p) permutates all its $(p-1)/2^t$ odd-parity rank elements. The number of permutation cycles depends on the factorization of $(p-1)/2^t$. For example, when $(p-1)/2^t$ is a prime number p', there is a big permutation cycle comprising p'−1 elements.

The square of any even-parity rank element is another element whose rank is divided by two. Consequently, the even-parity ranking elements are distributed over $(p-1)/2^t$ branches. Each non-zero element with an odd-parity rank bears a branch with a length t comprising $2^t-1$ elements, namely: an element of a rank divisible by two but not by four and then, if t≧2, two elements of a rank divisible by four but not by eight, and then if t≧3, four elements of a rank divisible by eight but not by sixteen, and then if t≧4, eight elements of a rank divisible by sixteen but not by 32 and so on and so forth. The $2^{t-1}$ ends of each branch are non-quadratic residues; their rank is divisible by $2^t$.

FIGS. 1A to 1D illustrate the function "raise to the square in CG(p)" by an oriented graph where each of the p−1 non-zero elements of the field finds its place: the non-quadratic residues 1 are in white and the quadratic residues 5 are in black; among the quadratic residues 5, the odd-parity ranking elements 3 are in circles.

Figure 1B:
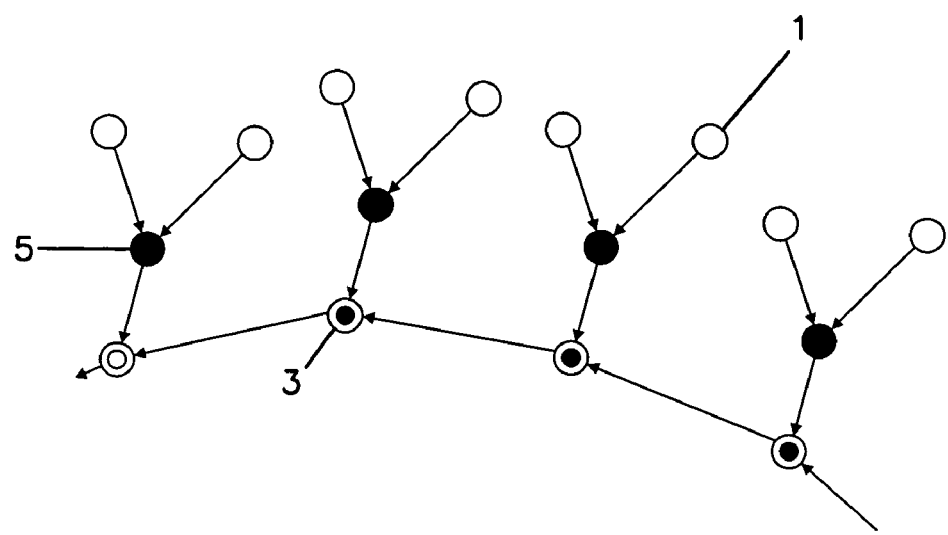
FIG. 1B shows the function "raise to the square in CG(p)" by an oriented graph in the case where p is congruent to 5 (mod 8).
Figure 1C:
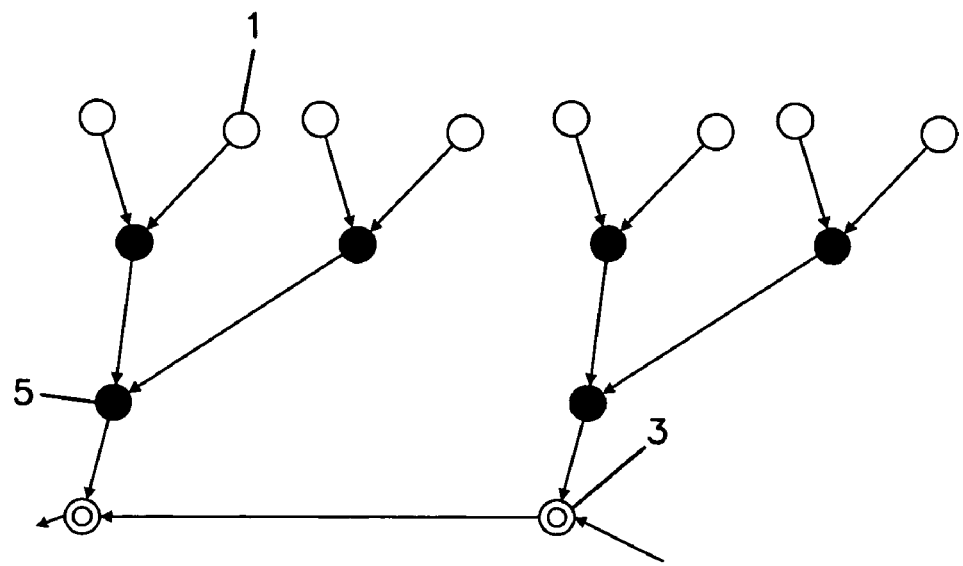
FIG. 1C shows the function "raise to the square in CG(p)" by an oriented graph in the case where p is congruent to 9 (mod 16).
Figure 1D:
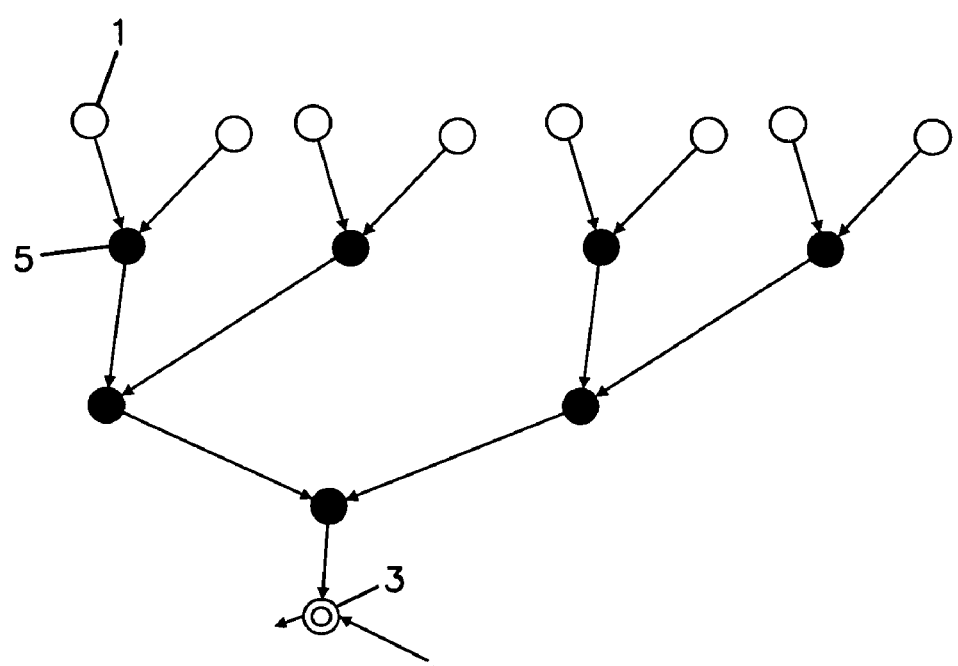
FIG. 1D shows the function "raise to the square in CG(p)" by an oriented graph in the case where p is congruent to 17 (mod 32).

These figures show respectively;

FIG. 1A: the case where p is congruent to 3 (mod 4);
FIG. 1B: the case where p is congruent to 5 (mod 8);
FIG. 1C: the case where p is congruent to 9 (mod 16);
FIG. 1D: the case where p is congruent to 17 (mod 32).

Let us now look at the way to calculate a solution in x to the equation $x^2 \equiv a$ (mod p), it being known that a is a quadratic residue of CG(p), namely how "to take a square root in CG(p)". There are of course several ways of obtaining the same result: the reader can advantageously consult Henri Cohen, "*A Course in Computational Algebraic Number Theory*", published, Springer, Berlin, 1993, pp. 31–36 as well as "*Graduate Texts in Mathematics*", vol. 138 (GTM 138).

Let us calculate an integer $s=(p-1+2^r)/2^{r+1}$ to establish a key (s, p). Let: ((p+1)/4, p) when p is congruent to 3 (mod 4), ((p+3)8, p) when p is congruent to 5 ((mod 8)), ((p+7)/16, p) when p is congruent to 9 (mod 16), ((p+15)/32, p) when p is congruent to 17 (mod 32), and so and so forth.

The key (s, p) gives the odd-parity ranking square root of any odd-parity ranking element. Indeed, in CG(p), $r^2/a$ is equal to a raised to the power $(2.(p-1+2^r)/2^{r+1})-1 = (p-1)/2^r$. Consequently, when a is in a cycle, the key (s, p) converts a into a solution that we shall call w. The other solution is p−w.

In general, the key (s, p) converts any quadratic residue a into a first approximation of a solution which shall be called r. The following are two key points followed by a rough sketch of a method for the step-by-step improvement of the approximation up to a square root of a.

Firstly, since a is a quadratic residue, the key $(2^{t-1}, p)$ certainly converts $r^2/a$ into 1.

Secondly, it may be assumed that we know a non-quadratic residue of CG(p) that we name y; the key $((p-1)/2^t, p)$ converts y into an element that shall be called b: this is a root $2^{t-1}$-th of −1. Indeed, $y^{(p-1)/2} \equiv -1$ (mod p). Consequently, in CG(p), the multiplicative group of the $2^t$ $2^t$-th roots of unity is isomorphic to, the multiplicative group of the powers of b for the exponents from 1 to $2^t$.

To approach a square root of a, let us raise $r^2/a$ to the power of $2^{t-2}$ (mod p): the result is +1 or −1. The new approximation remains r if the result is +1 or else it becomes b.r (mod p) if the result is −1. Consequently, the key $(2^{t-2}, p)$ certainly converts the new approximation into 1. It is possible to continue to approach the required value: at the next step, an adjustment will be made if necessary by multiplying by $b^2$ (mod p) and so on and so forth.

The following algorithm makes successive approximations to reach a square root of a from the integers r and b defined here above; it uses two integer variables: w initialized by r to represent the successive approximations and jj assuming values among the powers of 2, from 2 to $2^{t-2}$.

For i ranging from 1 to t−2, repeat the following sequence:

Compute $w^2/a$ (mod p), then raise the result to the power $2^{t−i−1}$ (mod p): +1 or −1 should be obtained. When −1 is obtained, compute $jj=2^i$, then replace w by $w.b^{jj}$ (mod p). When +1 is obtained, do nothing.

At the end of the computation, w and p−w are two square roots of a in CG(p). Furthermore, we learn that the rank of a in CG(p) is divisible by $2^t/jj$ but not by $2^{t+1}/jj$. The relevance of this observation will be seen further below.

Analysis of the Principles of GQ2 Technology in CG(p)

Let us take two integers g and k greater than 1 and a prime number p greater than g. Let us analyze the existence and number of solutions in x in CG(p) in the equations (1.a), (2.a) and (3.a).

In the Galois field CG(p), let us distinguish different cases depending on the value of t, namely, according to the power of two which divides p−1. It may be recalled that p−1 is divisible by $2^t$, but not by $2^{t+1}$, namely that p is congruent to $2^t+1$ (mod $2^{t+1}$). The previous analysis gives us a fairly precise idea of the problem raised as well as a rough solution.

When t=1, p is congruent to 3 (mod 4) as shown in FIG. 1A. The Legendre symbols of g and −g with respect to p are different: any quadratic residue of CG(p) has two square roots in CG(p): one is a quadratic residue and the other is a non-quadratic residue. Firstly, one of the two equations (1.a) or (2.a) has two solutions in x in CG(p) and the other does not have any. Secondly, the equation (3.a) has two solutions in x in CG(p) whatever the value of k.

When t=2, p is congruent to 5 ((mod 8)) as shown in FIG. 1B. Two cases occur, depending on the Legendre symbol of g with respect top. When the symbol is equal to −1, g and −g are both non-quadratic residues of CG(p): the three equations (1.a), (2.a) and (3.a) have no solution in x in CG(p). When the symbol is equal to +1, g and −g are two quadratic residues of CG(p), each equation (1.a) and (2.a) has two solutions in x in CG(p). Furthermore, the rank of $g^2$ in CG(p) is an odd-parity value implying that whatever the value of k, the equation (3.a) has four solutions in x in CG(p) of which only one has an odd-parity rank.

Figure 2:
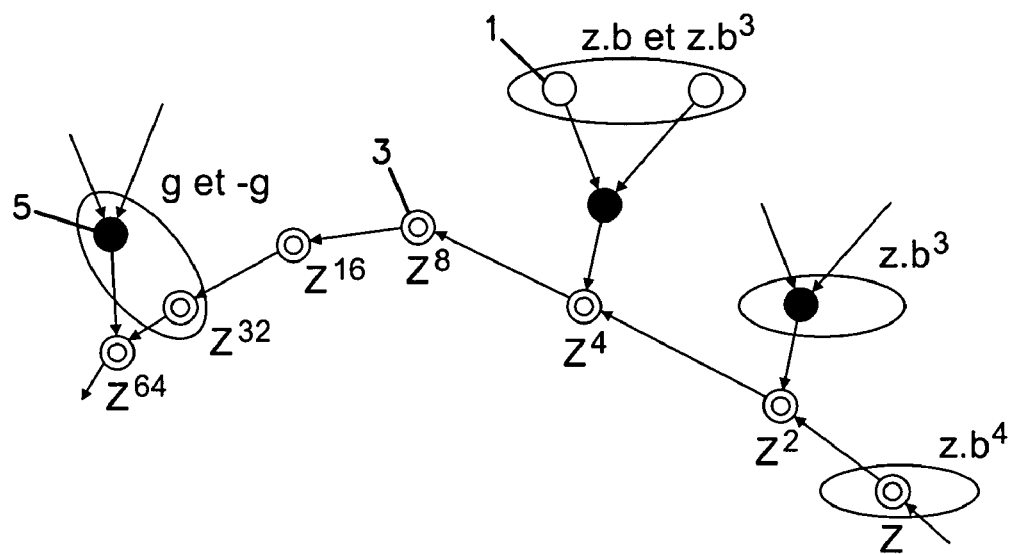
FIG. 2 shows the solutions to the equation (3.a) with k=6 and p congruent to 5 (mod 8), giving t=2.

FIG. 2 illustrates the solutions to the equation (3.a) with k=6 and p congruent to 5 (mod 8), giving t=2. It may be noted that, because the Legendre symbol of 2 with respect to p congruent to 5 (mod 8) is equal to $−1.2^{(p−1)/4}$ (mod p) is then a square root of −1. We therefore have:

$p≡5 (\mod 8)$; consequently $(2|p)=−1$ (mod p); hence $b^2≡−1 (\mod p)$ $$p \equiv 2^{\frac{p-1}{4}}$$

When t=3, p is congruent to 9 (mod 16) as shown in FIG. 1C. Let us consider the Legendre symbol of g with respect to p. When the symbol is equal to −1, g and −g are two non-quadratic residues of CG(p): the three equations (1.a), (2.a) and (3.a) have no solution in x in CG(p). When the symbol is equal to +1, g and −g are two quadratic residues of CG(p); each equation (1.a) and (2.a) has two solutions in x in CG(p). The existence of solutions in x to the equation (3.a) depends on the rank of $g^2$ in CG(p). This rank is an odd-parity value or is divisible by two but not by four. When the rank of $g^2$ in CG(p) is divisible by two but not by four, the equation (3.a) has four solutions in x in CG(p) for k=2; it cannot go above k≧3. When the rank of $g^2$ in CG(p) is an odd-parity value, the equation (3.a) has four solutions in x in CG(p) for k=2 and eight for k≧3. In both cases, only one value is an odd-parity value.

When t=4, p is congruent to 17 (mod 32) as shown in FIG. 1D. Let us consider the Legendre symbol of g with respect top. When the symbol is equal to −1, g and −g are two non-quadratic residues of CG(p): the three equations (1.a), (2.a) and (3.a) have no solution in x in CG(p). When the symbol is equal to +1, g and −g are two quadratic residues of CG(p); each equation (1.a) and (2.a) has two solutions in x in CG(p). The existence of solutions in x to the equation (3.a) depends on the rank of $g^2$ in CG(p). This rank is an odd-parity value or is divisible by two or four but not by eight. When the rank of $g^2$ in CG(p) is divisible by two but not by eight, the equation (3.a) has four solutions in x in CG(p) for k=2; it cannot go above k≧3. When the rank of $g^2$ in CG(p) is divisible by two but not by four, the equation (3.a) has four solutions in x in CG(p) for k=2 or eight for k≧3; it has no solutions for k≧4. When the rank of $g^2$ in CG(p) is an odd-parity value, the equation (3.a) has four solutions in x in CG(p) for k=2 and eight for k≧3 and sixteen for k≧4. In all three cases, only one value is an odd-parity value.

And so on and so forth so that the case where p is congruent to 1 (mod 4) can be summarized as follows.

When p is congruent to 1 (mod 4), let us consider the Legendre symbol of g with respect to p. When the symbol is equal to −1, g and −g are two non-quadratic residues of CG(p): the three equations (1.a), (2.a) and (3.a) have no solution in x in CG(p). When the symbol is equal to +1, g and −g are two quadratic residues of CG(p); each equation (1.a) and (2.a) has two solutions in x in CG(p). Let us define the integer u: the rank of $g^2$ in CG(p) is divisible by $2^u$, but not by $2^{u+1}$. The value of u is among the t−1 possible values, from 0 to t−2. The existence and the number of solutions in x in CG(p) to the equation (3.a) depend on the values of k, t and u. When u is positive and k is greater than t−u, the equation (3.a) does not have a solution in x in CG(p). When u is zero and k is greater than t, the equation (3.a) has $2^t$ solutions in x in CG(p). When k is smaller than or equal to t−u, the equation (3.a) has $2^k$ solutions in x in CG(p).

Applicability of the GQ2 Principles in the Rings of Integers Modulo

In order that the equation (1) and (2) respectively may have no solution in x in the ring of the integers modulo n, it is necessary and sufficient that, for at least one of the prime factors p, from $p_1$ to $p_f$, the equation (1.a) and (2.a) respectively will have no solution in x in CG(p).

In order that the equation (3) may have solutions in x in the ring of the integers modulo n, it is necessary and sufficient that, for each of the prime factors p, from $p_1$ to $p_f$, the equation (3.a) should have solutions in x in CG(p).

The equation (3) prohibits any prime factor p congruent with 1 (mod 4) as soon as, for one of the base numbers g, from $g_1$ to $g_m$: either the Legendre symbol of g with respect to p is equal to −1; or else the Legendre symbol of g with respect to p is equal to +1 with the condition: u positive and greater than t−k. In order that a prime factor p congruent to 1 (mod 4) may be possible, it is necessary to fulfill one of the following two conditions for each of the base numbers g, from $g_1$ to $g_m$, according to the two integers t and u defined here above. Either the rank of $G=g^2$ is an odd-parity rank in CG(p), namely u=0, whatever the value of k. Or else the rank of $G=g^2$ is an even-parity rank value in CG(p), namely u>0 and it meets the condition: u+k≦t.

A product of prime factors congruent to 1 (mod 4) cannot fulfill all the principles of GQ2 technology. Each GQ2 modulus must have at least two prime factors congruent to 3 (mod 4) such that, for each base number g, the Legendre symbol of g with respect to on of these factors differs from the Legendre symbol of g with respect to the other. When all the prime factors are congruent to 3 (mod 4), it will be said that the GQ2 modulus is basic. When, in addition to at least two prime factors congruent to 3 (mod 4), the modulus includes one or more prime factors congruent to 1 (mod 4), it will be said that the modulus GQ2 is combined.

Systematic Construction of Moduli GQ2

At the outset, it is necessary to fix the total constraints to be dictated on the modulus n: a size expressed in bits (for example, 512 or 1024 bits) as well as a number of most significant successive bits at 1 (at least one of course typically 16 or 32 bits), a numberf of prime factors and a number e (possibly zero) of prime factors having to be congruent to 1 (mod 4); the other prime factors, namely f–e factors, at least two, must be congruent to 3 (mod 4). The modulus n will be the product off prime factors of similar sizes. When e=0, a basic modulus GQ2 is obtained; when e>0, a combined modulus GQ2 is obtained. A basic modulus is the product of prime factors all congruent to 3 (mod 4). A combined modulus GQ2 appears therefore as the product of a basic modulus GQ2 multiplied by one or more other prime factors congruent to 1 (mod 4). First of all prime factors congruent to 3 (mod 4) are produced. Then, if e>0, prime factors congruent to 1 (mod 4) are produced.

For the efficacy of the construction of GQ2 moduli, it is definitely better to select each candidate before seeking to find out if it is a prime value.

Referenced by $g_1$ $g_2$ . . . , the base numbers are found typically among the first prime numbers: 2, 3, 5, 7, . . . If there are no indications to the contrary, the m base numbers are the m first prime numbers: $g_1$=2, $g_2$=3, $g_3$=5, $g_4$=7, . . . However, the following points must be noted: 2 must be avoided if a factor congruent with 5 (mod 8) is anticipated; 3 must be avoided if the public key (3, n) has to be used as the RSA public verification key.

Choice of f–e Prime Factors Congruent with 3 (mod 4)

On the basis of the second factor, the program requests and uses one base number per factor. For the choice of the last factor congruent with 3 (mod 4), the program finds out if there are other base numbers, namely if m is equal to or greater than f–e and then, if this is the case, requests and takes account of the last base numbers, from $g_{f-e}$ to $g_m$. To formalize the choice of the prime factors congruent with 3 (mod 4), we have introduced a notion of the profile. The profile characterizes an integer g with respect to a set of prime factors greater than g and congruent with 3 (mod 4).

When an integer g has the same Legendre symbol with respect to two prime factors, it is said that the prime factors are equivalent with respect to g. Else, they are complementary with respect to g.

Referenced by $Profile_f(g)$, the profile of an integer g with respect to f prime factors $p_1$ $p_2$ . . . $p_f$ is a sequence of f bits, one bit per prime factor. The first bit is equal to 1; each following bit is equal to 1 or 0 depending on whether the next factor is equivalent or complementary to $p_1$ with respect to g.

When all the bits of a profile are equal to 1, it is said that the profile is flat. In such a case, all the Legendre symbols of g are equal to +1 or else to –1. When the profile of g is not flat, the equations (1) and (2) cannot be solved in x in the ring of the integers modulo n.

By definition, the profile of g with respect to a single prime number congruent to 3 (mod 4) is always flat. This extension is used to generalize the algorithm of choice of the prime factors congruent to 3 (mod 4).

When the profiles of two base numbers $g_1$ and $g_2$ are different, which implies at least three prime factors congruent to 3 (mod 4), the knowledge of the two private values $Q_1$ and $Q_2$ induces knowledge of two different decompositions of the modulus n. When the base numbers are small prime numbers, the program ensures that the profiles of $2^{f-e-1}-1$ multiplicative combinations of f–e–1 basic prime numbers are all different: they take all the possible values. The notion of profile does not extend to the prime factors congruent to 1 (mod 4).

First prime factor $p_1$ congruent to 3 (mod 4): each candidate must be congruent to 3 (mod 4) without any other particular constraint.

Second prime factor $p_2$ congruent to 3 (mod 4) with the first base number $g_1$ being taken into account: each candidate must be complementary to p, with respect to $g_1$.

Third prime factor $p_3$ congruent to 3 (mod 4) with the second base number $g_2$ being taken into account: according to the profile of $g_2$ with respect to two first prime factors $p_1$ and $p_2$, two cases occur. When $Profile_2(g_2)$ is flat, each candidate must be complementary to p, with respect to $g_2$. Else, we have $Profile_2(g_1)=Profile_2(g_2)$; each candidate must then ensure that $Profile_3(g_1) \neq Profile_3(g_2)$.

Choice of i-th prime factor $p_{i+1}$ congruent to 3 (mod 4) with the base number $g_i$ being taken into account: according to the profile of $g_i$ with respect to i first prime factors $p_1$, $p_2$, . . . . $p_i$, two cases occur. When $Profile_i(g_i)$ is flat, each candidate must be complementary to $p_1$ with respect to $g_i$. Else, among the i–1 base numbers $g_1$, $g_2$, . . . $g_{i-1}$ and all their multiplicative combinations $g_1 \cdot g_2, \ldots, g_1 \cdot g_2 \cdots g_{i-1}$, namely $2^{i-1}-1$ integers in all, there is one and only one integer g such that $Profile_i(g_i)=Profile_i(g)$; each candidate must then ensure that $Profile_{i+1}(g_i) \neq Profile_{i+1}(g)$.

Last prime factor $p_{f-e}$ congruent to 3 (mod 4) with the base number $g_{f-e-1}$ and the other base numbers from $g_{f-e}$ to $g_m$ being taken into account: the constraints due to the base number $g_{f-e-1}$ are taken into account as above. Furthermore, when m is equal to or greater than f–e, each candidate must provide for a non-flat profile for the last base numbers, from $g_{f-e}$ to $g_m$, with respect to the f–e prime factors. Each candidate must be complementary to $p_1$ with respect to all the values of $g_i$ for which $Profile_{f-e-1}(g_i)$ is flat.

In short, the prime factors congruent to 3 (mod 4) are chosen as a function of one another.

For i ranging from 0 to f–e–1, to choose the i+1-th prime factor congruent to 3 (mod 4), the candidate $p_{i+1}$ must successfully pass the following examination:

If i>m or if i=0, then the candidate $p_{i+1}$ has no other constraint; it is therefore accepted.

If $0 < i \leq m$, then the candidate $p_{i+1}$ must take account of the i-th base number $g_i$. The profile $Profile_i(g_i)$ of the base number $g_i$ with respect to the i first prime factors from $p_1$ to $p_i$ is computed. Depending on the result, one and only one of the two following cases may occur:

If the profile is flat, then the candidate $p_{i+1}$ must be complementary to $p_1$ with respect to $g_i$; else, it must be rejected.

Else, among the i–1 base numbers and all their multiplicative combinations there is one and only one number that we call g such that $Profile_i(g)=Profile_i(g_i)$; then the candidate $p_{i+1}$ must be such that $Profile_{i+1}(g) \neq Profile_{i+1}(g_i)$; else, it must be rejected.

If i+1=f−e and i<m, namely to choose the last prime factor congruent to 3 (mod 4) when there remain base numbers, from $g_{f-e}$ to $g_m$, which have not yet been taken into account, the candidate $p_{f-e}$ must take them into account: among these base numbers, those numbers whose profile $\text{Profile}_{f-e-1}(g_i)$ is flat are chosen; the candidate $p_{f-e}$ must be complementary to $p_1$ with respect to each of the base numbers thus selected; else they must be rejected.

The candidate is accepted because it has successfully undergone the appropriate tests.

Choice of e Prime Factors Congruent to 1 (mod 4)

To be acceptable, each candidate p congruent to 1 (mod 4) must fulfill the following conditions with respect to each base number from $g_1$ to $g_m$.

Let us evaluate the Legendre symbol of each base number $g_i$ with respect to p. If the symbol is equal to −1, let us reject the candidate p and go to another candidate. If the symbol is equal to +1, let us continue the evaluation of the candidate. It must be noted that if an integer 2 is used as the base number, then all the candidates congruent to 5 (mod 8) must be removed: the base number 2 is incompatible with a factor congruent to 5 (mod 8).

Let us calculate an integer $s=(p-1+2^t)/2^{t+1}$ to establish a key (s, p). Let us apply the key (s, p) to each public value $G_i$ to obtain a result r. Two cases occur.

If r equals $g_i$ or $-g_i$, then u=0. In this case, and in this case alone, $G_i$ is in a cycle. A trivial case may be noted: $G_i$ is in a cycle provided that p is congruent to 5 (mod 8) and that the Legendre symbol of $g_i$ with respect to p is equal to +1. It may be recalled that $G_i$=4 is impossible in this case.

If r is equal to neither $g_i$ nor $-g_i$, then u>0; it must be noted that the key $((p-1)/2^t, p)$ converts every non-quadratic residue y into an element b which is a primitive $2^t$-th root of unity. The following algorithm computes u from r and b by using two integer variables: w initialized by r and jj taking values of 2 to $2^{t-2}$.

For i going from 1 to t−2, repeat the following sequence:

Compute $w^2/G_i$ (mod $p_j$) then raise the result to the power $2^{t-i-1}$ (mod $p_j$): we must obtain +1 or −1. When −1 is obtained, compute jj=$2^i$, then replace w by $w.b^{jj}$ (mod $p_j$). When +1 is obtained, do nothing.

At the end of the computation, the variable w has the value $g_i$ or $-g_i$. Furthermore, we know that the rank of $G_i$ in $CG(p_j)$ is divisible by $2^t/jj$ but not by $2^{t+1}/jj$, namely that jj determines the value of u by jj=$2^{t-u}$. When v is greater than jj, namely k>t−u, reject the candidate and go to another candidate. When v is smaller than or equal to jj, namely k≦t−u, continue the evaluation of the candidate.

When the f prime factors have been produced, the public modulus n is the product of the f prime factors $p_1, p_2, \ldots p_f$. The unsigned integer n can be represented by a binary sequence; this sequence complies with the constraints imposed at the beginning of a program for the size in bits and for the number of successive most significant bits at 1. The choice of the prime factors provides for the following properties of the modulus n with respect to each of the m base numbers $g_1, g_2, \ldots g_m$. Furthermore, the equations (1) and (2) have no solution in x in the ring of the integers modulo n. Secondly, the equation (3) has solutions in x in the ring of the integers modulo n.

In short, the prime factors congruent to 1 (mod 4) are chosen independently of one another. While the factors congruent to 3 (mod 4) gradually take account of the base numbers, each prime factor congruent to 1 (mod 4) must take account of all the constraints dictated by each of the base numbers. Each prime factor congruent with 1 (mod 4), namely p, from $p_{f-e}$ to $p_f$, should have successfully undergone the following examination in two steps.

1) The step (1) is executed successively for each of the m base numbers from $g_1$ to $g_m$.

The Legendre symbol of the current base number g with respect to the candidate p is computed. One and only of the following two cases arises: if the symbol is equal to −1, the candidate is rejected. Else (the symbol is equal to +1), the examination is continued in passing to the base number g following the step (1).

When the candidate is acceptable for all the m base numbers, the operation passes to the step (2).

2) The step (2) is executed successively for each of the m public values of $G_1$ to $G_m$.

An integer t is computed such that p−1 is divisible by $2^t$ but not by $2^{t+1}$, then an integer $s=(p-1+2^t)/2^{t+1}$, so as to set up a key (s, p). The key (s, p) is applied to the current public value $G=g^2$ to obtain a result r, namely: $r \equiv G^s$ (mod p). Depending on the result, one and only one of the following states arises:

a) If r is equal to g or to −g, then u=0; the examination of the candidate is continued in passing to the following public value G at the step (2).

b) Else, a positive number u is computed taking one of the values from 1 to t−2, in applying the following algorithm which implements two variables: jj taking values ranging from 2 to $2^{t-2}$ and w initialized by r, as well as an integer b obtained by applying a key $((p-1)/2^t, p)$ to a non-quadratic residue of CG(p).

For an index ii ranging from 1 to t−2, the following operation is repeated:

$w^2/G$ (mod p) is computed and then a key $(2^{t-ii-1}, p)$ is applied to the result to obtain +1 or −1 (else, there is proof that the candidate is not a prime factor). If −1 is obtained, then jj=$2^{ii}$ is computed and then c≡$b^{jj}$ (mod p), and then w is replaced by w.c (mod p), then there is a passage to the next index ii. If +1 is obtained, there is a passage to the next index ii.

At the end of the algorithm, the value in the variable jj defines u by the relationship jj=$2^{t-u}$; the value in the variable w is a square root of G, namely g or −g (else, there is proof that the candidate is not a prime factor). Two cases occur:

If t−u<k then the candidate p is rejected because the branch where G occurs is not long enough.

If (t−u≧k), the evaluation of the candidate is continued in going to the next public value G following the step (2).

When the candidate is acceptable for all the m public values, it is accepted as a prime factor congruent with 1 (mod 4).

Computation of the Associated Values

To obtain the private components, let us first calculate all the solutions to the equation (3.a) in the two simplest and most current cases before taking up the general case.

For each prime factor $p_j$ congruent to 3 (mod 4), the key $((p_j+1)4, p_j)$ gives the quadratic square root of any quadratic residue. From this, a method is deduced for computing a solution to the equation (3.a):

$$s_j \equiv ((p_j+1)/4)^k (\bmod (p_j-1)/2); \text{ then, } Q_{i,j} \equiv G_i^{s_j} (\bmod p_j)$$

or else rather the inverse (mod $p_j$) of such a solution.

$$s_j \equiv (p_j-1)/2 - ((p_j+1)/4)^k (\bmod (p_j-1)/2); \text{ then, } Q_{i,j} \equiv G_i^{s_j} (\bmod p_j)$$

In $CG(p_j)$, there are then two and only two square roots of unity: +1 and −1; there are therefore two solutions in x to the equation (3.a): the two numbers $Q_{i,j}$ and $p_j - Q_{i,j}$ are the same square $G_i$(mod $p_j$).

For each prime factor $p_j$ congruent to 5 (mod 8), the key $((p_j+1)/4, p_j)$ gives the odd-parity ranking square root of any odd-parity ranking element. From this, a solution to the equation (3.a) is deduced:

$$s_j \equiv ((p_j+3)/8)^k (\bmod (p_j-1)/4); \text{ then, } Q_{i,j} \equiv G_i^{s_j} (\bmod p_j)$$

or else rather the inverse (mod $p_j$) of such a solution.

$$s_j \equiv (p_j-1)/4 - ((p_j+3)/8)^k (\bmod (p_j-1)/4); \text{ then } Q_{i,j} \equiv G_i^{s_j} (\bmod p_j)$$

In $CG(p_j)$, there are then four and only four fourth roots of unity; there are therefore four solutions in x to the equation (3.a). Let us note that $2^{(p_j-1)/4}$ (mod $p_j$) is a square root of −1 because the Legendre symbol of 2 with respect to p congruent to 5 (mod 8) is equal to −1. If $Q_{i,j}$ is a solution, then $p_j - Q_{i,j}$ is another solution, as well as the product (mod $p_j$) of $Q_{i,j}$ by a square root of −1.

For a prime factor $p_j$ congruent to $2^t+1$ (mod $2^{t+1}$), the key $((p_j-1+2^t)/2^{t+1}, p_j)$ gives the odd parity square root of any odd-parity ranking element. It is therefore possible to compute a solution to the equation (3.a).

Let us first of all compute an integer $s_j \equiv ((p_j-1+2^t)/2^{t+1})^k$ (mod $(p_j-1)/2^t$) to set up a key $(s_j, p_j)$.

When the key $((p_j-1+2^t)/2^{t+1}, p_j)$ converts $G_i$ into $g_i$ or into $-g_i$ the rank of $G_i$ is an odd-parity value in $CG(p_j)$ (u=0). Then, the key $(s_j, p_j)$ converts $G_i$ into a number z: this is the odd-parity ranking solution to the equation (3.a). According to the values of t and k, there is still min($2^k-1$, $2^t-1$) other solutions on one or more branches. The branch of $z^2$ carries another solution: this is $p_j - z$. When $t \geq 2$, the branch of $z^4$ has two other solutions: it is the product of z by each of the two square roots of −1, namely each of the two primitive fourth roots of unity. Now, if y is a non-quadratic residue of $CG(p_j)$, then $y^{(p_j-1)/4}$ (mod $p_j$) is a square root of −1. In general, for i taking each value of 1 to min(k, t), the branch of the $2^i$-th power of z bears $2^{i-1}$ solutions: these are the products (mod $p_j$) of z by each of the $2^{i-1}$ primitive $2^i$-th roots of unity. Now if y is a non-quadratic residue of $CG(p_j)$, then y to the power $(p^i-1)/2^i$ is a $2^i$-th primitive root of unity that we call c. The $2^{i-1}$ to $2^i$-th primitive roots of unity are the odd parity powers of c: c, $c^3$ (mod $p_j$), $c^5$ (mod $p_j$), ... c to the power $2^i-1$ (mod $p_j$).

When the key $((p_j-1+2^t)/2^{t+1}, p_j)$ converts $G_i$ into an integer r that is neither $g_i$ nor $-g_i$, the rank of $G_i$ is an even-parity value in $CG(p_j)$ (u>0). Then, provided that $G_i$ is appropriately placed in a fairly lengthy branch, namely $t \geq k+u$, there are $2^k$ solutions on the branch where $G_i$ is located. To compute a $2^k$-th root, it is enough to reiterate the above-stated square root computation algorithm k rank times, so as to compute the square root of the successive results up to a solution z. This computation may of course be optimized to directly approach a $2^k$th root and then adjust the approximation of a $2^k$-th root in a single operation to achieve a solution z. To obtain all the other solutions, it may be noted first of all that if y is a non-quadratic residue of $CG(p_j)$, then y to the power $(p_j-1)/2^k$ is a primitive $2^k$-th root of unity which we shall call d. The $2^k$ $2^k$-th roots of unity are successive powers of d: d, $d^2$ (mod $p_j$), $d^3$ (mod $p_j$), ... d to the power of $2^k-1$ (mod $p_j$), d to the power $2^k$ (mod $p_j$) equal to 1. The $2^k$ solutions on the branch where $G_i$ is located are the products (mod $p_j$) of z for each of these roots.

In short, to compute a component for the prime factor p and the base number g, with k, t and u being known, the following procedure is used:

1) An integer is computed: $s \equiv ((p-1+2^t)/2^{t+1})^k$ (mod $(p-1)/2^t$) to set up a key (s, p). Then, the key (s, p) is applied to G to obtain $z \equiv G^s$ (mod p). According to the value of u, there is a passage to the step (2) or (3).

2) If u=0, z is the odd-parity solution to the equation (3.a). There are still min($2^k-1$, $2^t-1$) other even-parity ranking solutions on one or more branches, very precisely on min(k, t) other branches. For i ranging from 1 to min(k, t), the branch of the $2^i$-th power of z has $2^{i-1}$ solutions: these are the products (mod p) of z by each of $2^{i-1}$ $2^i$-th primitive roots of unity. The generic solution to the equation (3.a) is shown by zz. The operation goes to the step (4).

3) If u>0, all the solutions to the equation (3.a) are even-parity solutions. There are $2^k$ of them and they are all in the branch on which G is, located; indeed: $t-u \geq k$. To compute a solution, the following algorithm implements two variables: jj assuming values ranging from 2 to $2^{t-2}$ and w initialized by z, as well as an integer b obtained by applying a key $((p-1)/2^t, p)$ to a non-quadratic residue of CG(p).

The following sequence is repeated k ranking times.

For an index ii ranging from 1 to t−2, the following operation is repeated: $w^2/G$ (mod p) is computed and then a key $(2^{t-ii-1}, p)$ is applied to the result to obtain +1 or −1 (else there is proof that p is not a prime number). If −1 is obtained, then $jj=2^{ii}$ is computed, then $c \equiv b^{jj}$ (mod p), then w is replaced by w.c (mod p), then there is a passage to the next index ii. If +1 is obtained, there is a passage to the next index ii.

At the end of the algorithm, the variable w has the value za. The $2^k$ solutions on the branch where G is located are the products (mod p) of za by each of the $2^k$-th roots of unity. The generic solution to the equation (3.a) is represented by zz. The operation passes to the step (4).

4) With zz being known, a component value is deduced therefrom: it is the inverse of zz modulo p when the equation $G.Q^v \equiv 1$ (mod n) is used and zz when the equation $G \equiv Q^v$ (mod n) is used.

Note. There are various methods to obtain the private components and the private values. If a collection of f components is known, namely the f components for a given base number, the Chinese remainder technique is used to compute the corresponding private value. It can be seen that for a given public value G and a modulus n, it is possible to have several possible private values Q. There are four of them when n is the product of two prime factors congruent to 3 (mod 4); there are eight of them with three prime factors congruent to 3 (mod 4); there are sixteen of them with two prime factors congruent to 3 (mod 4) and one congruent to 5 (mod 8). A judicious use of these multiple values may complicate the attacks by analysis of the electrical consumption of a chip card using GQ2.

Thus, as and when t increases, the program gets complicated for increasingly rare cases. Indeed, the prime numbers are distributed on an average as follows: t=1 for one in two, t=2 for one in four, t=3 for one in eight and so on and so forth. Furthermore, the constraints due to m base numbers make the candidacies increasingly unacceptable. Whatever the case may be, the combined moduli definitively form part of GQ2 technology; the type of GQ2 modulus in no way affects the dynamic authentication and digital signature protocols.

Figure 3:
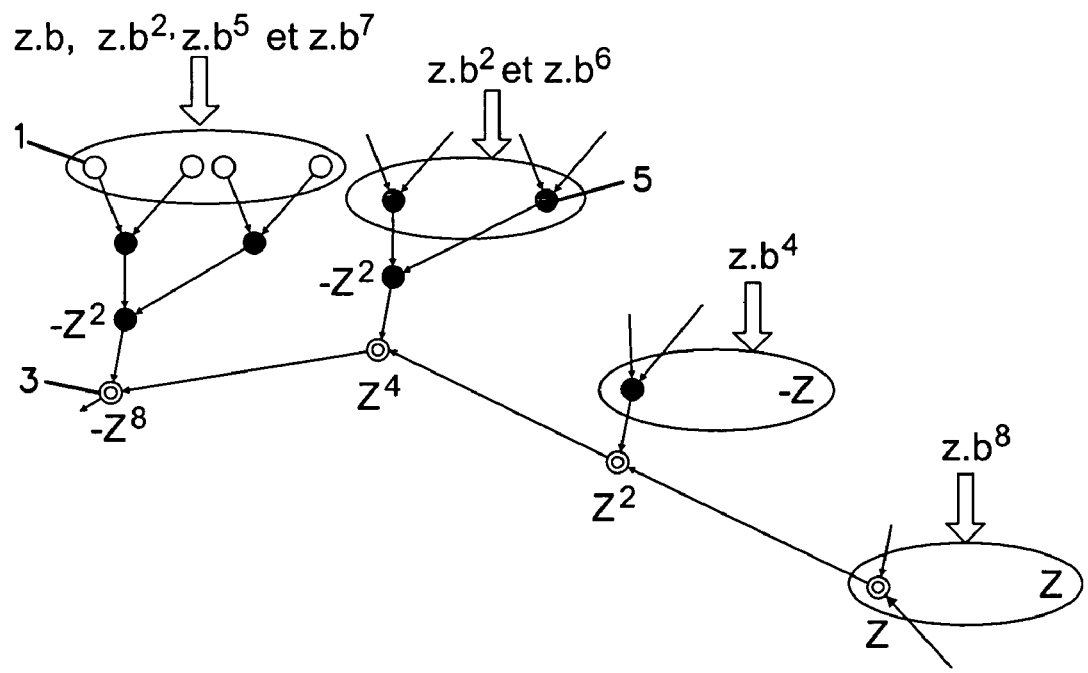
FIG. 3 shows $G_i = g_i^2$ in a cycle with a prime factor p congruent to 9 (mod 16).

FIG. 3 illustrates $G_i = g_i^2$ in a cycle with a prime factor p congruent to 9 (mod 16), namely t=3, u=0, as well as k≧3. It may be noted that:

$$b \equiv y^{\frac{p-1}{8}}$$

(mod p)
$b^8 \equiv 1$ (mod p)
$b^4 \equiv -1$ (mod p)

Figure 4:
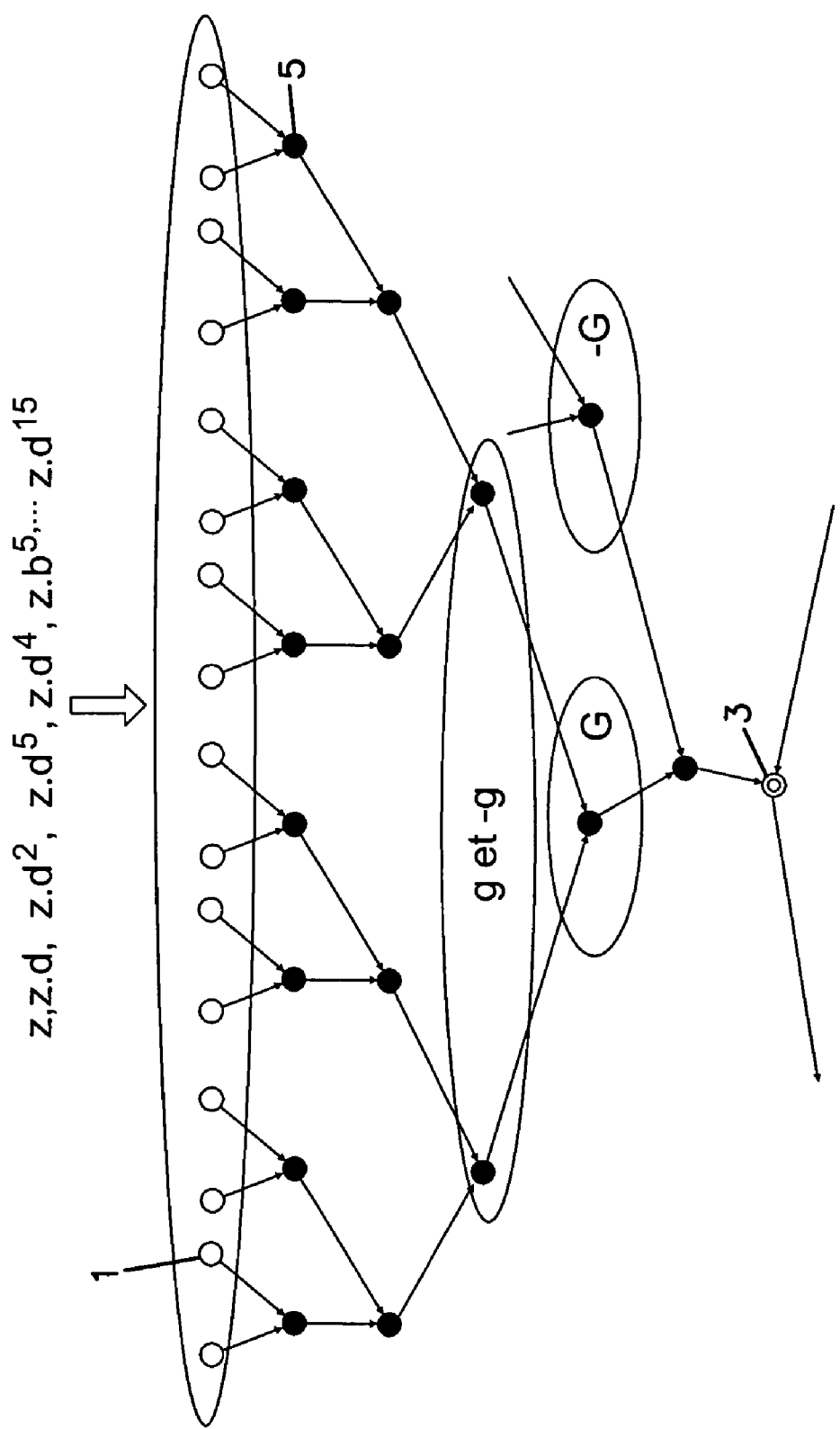
FIG. 4 shows $G_i = g_i^2$ on a branch with a prime factor p congruent to 65 (mod 128).

FIG. 4 illustrates $G_i = g_i^2$ on a branch with a prime factor p congruent to 65 (mod 128), namely t=6 as well as k=4 and u=2.

Here is a first set of keys GQ2 with k=6, giving v=64, m=3, giving three base: $g_1=3$, $g_2=5$ et $g_3=7$, and f=3, namely a modulus with three prime factors: two congruent to 3 (mod 4) and one to 5 (mod 8). It must be noted that g=2 is incompatible with a prime factor congruent to 5 (mod 8).

$p_1$=03CD2F4F21E0EAD60266D5CFCEBB6954683493E2E833

$(2|p_1)=-1$; $(3|p_1)=+1$; $(5|p_1)=-1$; $(7|p_1)=+1$ $p_2$=0583B097E8D8D777BAB3874F2E76659BB614F985EC1B $(2|p_1)=-1$; $(3|p_1)=-1$; $(5|p_1)=+1$; $(7|p_1)=-1$ $p_3$=0C363CD93D6B3FEC78EE13D7BE9D84354B8FDD6DA1FD $(2|p_1)=-1$; $(3|p_1)=+1$; $(5|p_1)=+1$; $(7|p_1)=+1$ n=$p_1 \cdot p_2 \cdot p_3$=FFFF81CEA149DCF2F72EB449C5724742FE2A3630D902CC00EAFEE1B957F3BDC49BE9CBD4D94467B72AF28CFBB26144CDF4BBDBA3C97578E29CC9BBEE8FB6DDDD $Q_{1,1}$=0279C60D216696CD6F7526E23512DAE090CFF879FDDE $Q_{2,1}$=7C977FC38F8413A284E9CE4EDEF4AEF35BF7793B89

$Q_{3,1}$=6FB3B9C05A03D7CADA9A3425571EF5ECC54D7A7B6F $Q_{1,2}$=0388EC6AA1E87613D832E2B80E5AE8C1DF2E74BFF502

$Q_{2,2}$=04792CE70284D16E9A158C688A7B3FEAF9C40056469E $Q_{3,2}$=FDC4A8E53E185A4BA793E93BEE5C636DA731BDCA4E $Q_{1,3}$=07BC1AB048A2EAFDAB59BD40CCF2F657AD8A6B573BDE $Q_{2,3}$=0AE8551E116A3AC089566DFDB3AE003CF174FC4E4877

$Q_{3,3}$=01682D490041913A4EA5B80D16B685E4A6DD88070501

$Q_1$=D7E1CAF28192CED6549FF457708D50A7481572DD5F2C335D8C69E22521B510B64454FB7A19AEC8D06985558E764C6991B05FC2AC74D9743435AB4D7CF0FF6557

$Q_2$=CB1ED6B1DD649B89B9638DC33876C98AC7AF689E9D1359E4DB17563B9B3DC582D5271949F3DBA5A70C108F561A274405A5CB882288273ADE67353A5BC316C093

$Q_3$=09AA6F4930E51A70CCDFA77442B10770DD1CD77490E3398AAD9DC50249C34312915E55917A1ED4D83AA3D607E3EB5C8B197697238537FE7A0195C5E8373EB74D

The following are other possible values for the components related to the $p_3$ which is congruent to 5 (mod 8).

The following is a square root of −1 in $CG(p_3)$: $c=2^{(p3-1)/4}$ (mod $p_3$)=0C3000933A854E4CB309213F12CAD59FA7AD775AAC37

$Q'_{1,3}=c \cdot Q_{1,3}$ (mod $p_3$)=050616671372B87DEC9AEEAC68A3948E9562F714D76C $Q'_{2,3}=c \cdot Q_{2,3}$ (mod $p_3$)=06F308B529C9CE8D037D01002E7C838439DACC9F8AA $Q'_{3,3}=c \cdot Q_{3,3}$ (mod $p_3$)=015BE9F4B92F1950A69766069F788E45439497463D58

Giving:

$Q'_1$=676DF1BA369FF306F4A1001602BCE5A008DB82882E87C148D0D820A711121961C9376CB45C355945C5F2A9E5AFAAD7861886284A9B319F9E4665211252D74580

$Q'_2$=CAEC4F41752A228CF9B23B16B3921E47C059B9E0C68634C2C64D6003156F30EF1BC02ADA25581C8FDE76AA 14AB5CC60A2DE1C565560B27E8AA0E6F4BCA7FE966

$Q'_3$=2ACDF5161FE53B68CC7C18B6AFE495815B46599F44C51A6A1A4E858B470E8E5C7D2200EF135239AF0B7230388A6A5BDD8EE15B0D094FC2BFA890BFDA669D9735

The following is a second set of keys GQ2, with k=9, that is v=512, m=2, that is two base numbers: $g_1=2$ and $g_2=3$, and f=3, giving a modulus with three prime factors congruent to 3 (mod 4).

$p_1$=03852103E40CD4F06FA7BAA9CC8D5BCE96E3984570CB $(2|p_1)=-1$; $(3|p_1)=-1$; and we get: $(6|p_1)=+1$.

$p_2$=062AC9EC42AA3E688DC2BC871C8315CB939089B61DD7

$(2|p_2)=+1$; $(3|p_2)=-1$; and we get: $(6|p_2)=-1$.

$p_3$=0BCADEC219F1DFBB8AB5FE808A0FFCB53458284ED8E3

$(2|p_3)=-1$; $(3|p_3)=+1$; and we get: $(6|p_3)=-1$.

$n = p_1 \cdot p_2 \cdot p_3$ = FFF5401ECD9E537F167A80C0A9111986F7A8EBA4D 6698AD68FF670DE5D9D77DFF00716DC7539F7CBBCF969E73A0C49 761B276A8E6B6977A21D51669D039F1D7

$Q_{1,1}$ = 0260BC7243C22450D566B5C6EF74AA29F2B927AF68E1

$Q_{2,1}$ = 0326C12FC7991ECDC9BB8D7C1C4501BE1BAE9485300E $Q_{1,2}$ = 02D0B4CC95A2DD435D0E22BFBB29C59418306F6CD00A $Q_{2,2}$ = 045ECB881387582E7C556887784D2671CA118E22FCF2

$Q_{1,3}$ = B0C2B1F808D24F6376E3A534EB555EF54E6AEF5982

$Q_{2,3}$ = 0AB9F81DF462F58A52D937E6D81F48FFA4A87A9935AB $Q_1$ = 27F7B9FC82C19ACAE47F3FE9560C3536A7E90F8C3C51E13C 35F32FD8C6823DF753685DD63555D2146FCDB9B28DA 367327DD6EDDA092D0CF108D0AB708405DA46

$Q_2$ = 230D0B9595E5AD388F1F447A69918905EBFB05910582E5BA64 9C94B0B2661E49DF3C9B42FEF1F37A7909B1C2DD541 13ACF87C6

The present application has described a method for the production of sets of GQ2 keys, namely moduli n and pairs of public and private values G and Q respectively, in which the exponent v is equal to $2^k$. These sets of keys are used to implement a method designed to prove the authenticity of an entity and/or the integrity and/or the authenticity of a message as has been described.

In the pending applications filed on the same day by France Télécom, TDF and the firm Math RiZK, and whose inventors are Louis Guillou and Jean-Jacques Quisquater, the characteristic features of the methods, systems and devices designed to prove the authenticity of an entity and/or the integrity and/or the authenticity of a message have been claimed. These two applications are incorporated herein by reference.

The invention claimed is:

1. A system for producing asymmetric cryptographic keys, said keys comprising $m \geq 1$ private values $Q_1$, $Q_2, \ldots, Q_m$ and m respective public values $G_1, G_2, \ldots, G_m$, the system comprising:
 a processor; and
 a memory unit coupled to the processor, the memory unit storing a set of instructions which when executed cause the processor to execute the following acts:
 selecting a security parameter k, wherein k is an integer greater than 1,
 determining a modulus n, wherein n is a public integer equal to the product of at least two prime factors $p_1, \ldots, p_f$, at least two of these prime factors, say $p_1$ and $p_2$, being such that $p_1 \equiv 3 \mod 4$ and $p_2 \equiv 3 \mod 4$;
 selecting m base numbers $g_1, g_2, \ldots, g_m$, wherein each base number $g_i$ (for $i = 1, \ldots, m$) is an integer greater than 1 and is a non-quadratic residue of the ring of integers modulo n, and such that $p_2$ is complementary to $p_1$ with respect to one of the base numbers;
 calculating the public values $G_i$ for $i = 1, \ldots, m$ through $G_i \equiv g_i^2 \mod n$; and calculating the private values $Q_i$ for $i = 1, \ldots, m$ by solving either the equation $G_i \cdot Q_i^v \equiv 1 \mod n$ or the equation $G_i \equiv Q_i^v \mod n$, wherein the public exponent v is such that $v = 2^k$.

2. The system according to claim 1, wherein a number (f−e) (where $e \geq 0$) of prime factors of the modulus n which are congruent to 3 mod 4 is larger than 2, and those prime factors $p_{j+1}$ for $2 \leq j \leq m$ which are congruent to 3 mod 4 are determined iteratively as follows:
 the profile profile$_j(g_j)$ of $g_j$ with respect to the prime factors $p_1, p_2, \ldots, p_j$ is computed, and
 if profile$_j(g_j)$ is flat, then the prime factor $p_{j+1}$ is chosen such that $p_{j+1}$ is complementary to $p_i$ with respect to $g_j$; else, a number g is chosen among the (j−1) base numbers $g_1, g_2, \ldots, g_{j-1}$, and all of their multiplicative combinations, such that profile$_j(g)$=profile$_j(g_j)$, then $p_{j+1}$ is chosen such that profile$_{j+1}(g_j) \neq$profile$_{j+1}(g)$,
 wherein the last prime factor $p_{f-e}$ congruent to 3 mod 4 is, in the case that $f-e \leq m$, chosen such that $p_{f-e}$ is complementary to $p_i$ with respect to all of the base numbers $g_i$ such that $f-e \leq i \leq m$ and whose profile profile$_{f-e-1}(g_i)$ is flat.

3. The system according to claim 1, wherein a number e of prime factors of the modulus n which are congruent to 1 mod 4 is at least equal to 1, and each such prime factor is determined as follows:
 a candidate prime number p is chosen, such that the Legendre symbol of each base number $g_i$ (for $i = 1, \ldots, m$) with respect to p is equal to +1,
 the integer t is computed which is such that (p−1) is divisible by $2^t$, but not by $2^{t+1}$,
 the integer $s = (p-1+2^t)/2^{t+1}$ is computed,
 an integer $b \equiv h^{p-1/2^t} \mod p$, where h is a non-quadratic residue of the body of integers modulo p, is computed,
 the m integers $r_i \equiv g_i^{2s} \mod p$ for $i = 1, \ldots, m$ are computed,
 an integer u is initialized to $u = 0$,
 the following sequence of steps, where i is initialized to 1, is iteratively implemented:
 an integer w is initialized to $w = r_i$,
 if $r_i \equiv \pm g_i$, the value of i is incremented and a sequence of steps with the new value of i is proceeded to if $i > m$, whereas the candidate prime number p is accepted as a factor of the modulus n if $i = m$,
 if $r_i \neq \pm g_i$:
 an integer jj is initialized to 1,
 the following sequence of steps, where an integer ii is initialized to 1, is iteratively implemented;
 $x \equiv w^2/g_i^2 \mod p$ is computed,
 $y \equiv x^2 \mod p$ is computed, and
 if $y = +1$, the sequence is terminated at the current value of ii,
 if $y = -1$, jj is assigned the value $jj = 2^{ii}$, the number w is assigned a new value equal to the old value multiplied by $b^{jj}$ modulo p, and
 for $ii < t-2$, the value of ii is incremented and a new iteration is proceeded to with the new value of ii,
 for $ii = t-2$, the value of number u is updated through the relation $jj = 2^{t-ii}$, and
 if $t-u < k$, the candidate prime number p is rejected as a factor of the modulus n,
 if $t-u > k$, the value of i is incremented and a sequence of steps with the new value of i is proceeded to if $i < n$, whereas the candidate prime number p is accepted as a factor of the modulus n if $i = m$.

4. The system according to claim 3, wherein, to compute f.m private components $Q_{i,j}$ of the private values $Q_1$, $Q_2, \ldots, Q_m$, the following steps are implemented for each couple (i, j):
- an integer t is determined, which is equal to 1 if $p_j$ is congruent to 3 mod 4, and to the value obtained for t according to claim 3 if $p_j$ is congruent to 1 mod 4,
- an integer u is determined, which is equal to 0 if $p_j$ is congruent to 3 mod 4, and to the value obtained for u according to claim 3 if $p_j$ is congruent to 1 mod 4,
- the integer $z \equiv G_i^s \bmod p_j$ is computed, where $s=(p-1+2^t)/2^{t+1}$,
- all the numbers zz are being considered, which:
  - if u=0, are such that zz=z or such that z is equal to the product modulo $p_j$ of z by each of the $2^{ii-1}$ $2^{ii}$-th primitive roots of unity, for ii ranging from 1 to min(k,t),
  - if u>0, are such that zz is equal to the product modulo $p_j$ of za by each of the $2^k$ $2^k$-th roots of unity, where za is the value obtained for w according to claim 3, and
- for each such number zz, a value for the component $Q_{i,j}$ is obtained by taking $Q_{i,j}$ equal to zz if the equation $G^i \equiv Q_i^v \bmod n$ is used, or to the inverse of zz modulo $p_j$ if $G_i.Q_i^v \equiv 1 \bmod n$ is used for this value of i.

5. A computer-readable storage medium storing instructions for producing asymmetric cryptographic keys, said keys comprising $m \geq 1$ private values $Q_1, Q_2, \ldots, Q_m$ and m respective public values $G_1, G_2, \ldots, G_m$, the medium storing instructions which when executed cause a processor to execute the following acts:
- selecting a security parameter k, wherein k is an integer greater than 1;
- determining a modulus n, wherein n is a public integer equal to the product of at least two prime factors $p_1, \ldots, p_f$, at least two of these prime factors, say $p_1$ and $p_2$, being such that $p_1 \equiv 3 \bmod 4$ and $p_2 \equiv 3 \bmod 4$;
- selecting m base number $g_1, g_2, \ldots, g_m$, wherein each base number $g_i$ (for $i=1, \ldots, m$) is an integer greater than 1 and is a non-quadratic residue of the ring of integers modulo n, and such that $p_2$ is complementary to $p_1$ with respect to one of the base numbers;
- calculating the public values $G_i$ for $i=1, \ldots, m$ through $G_i \equiv g_i^2 \bmod n$; and
- calculating the private values $Q_i$ for $i=1, \ldots, m$ by solving either the equation $G_i.Q_i^v \equiv 1 \bmod n$ or the equation $G^i \equiv Q_i^v \bmod n$, wherein the public exponent v is such that $v=2^k$.

6. The computer-readable storage medium storing instructions according to claim 5, wherein a number (f−e) (where $e \geq 0$) of prime factors of the modulus n which are congruent to 3 mod 4 is larger than 2, and those prime factors $p_{j+1}$ for $2 \leq j \leq m$ which are congruent to 3 mod 4 are determined iteratively as follows:
- the profile $profile_j(g_j)$ of $g_j$ with respect to the prime factors $p_1, p_2, \ldots, p_j$ is computed, and
- if $profile_j(g_j)$ is flat, then the prime factor $p_{j+1}$ is chosen such that $p_{j+1}$ is complementary to $p_1$ with respect to $g_j$; else, a number g is chosen among the (j−1) base numbers $g_1, g_2, \ldots, g_{j-1}$ and all of their multiplicative combinations, such that $profile_j(g)=profile_j(g_j)$, then $p_{j+1}$ is chosen such that $profile_{j+1}(g_j) \neq profile_{j+1}(g)$,
- wherein the last prime factor $p_{f-e}$ congruent to 3 mod 4 is, in the case that $f-e \leq m$, chosen such that $p_{f-e}$ is complementary to $p_i$ with respect to all of the base numbers $g_i$ such that $f-e \leq i \leq m$ and whose profile $profile_{f-e-1}(g_i)$ is flat.

7. The computer-readable storage medium storing instructions according to claim 5, wherein a number e of prime factors of the modulus n which are congruent to 1 mod 4 is at least equal to 1, and each such prime factor is determined as follows:
- a candidate prime number p is chosen, such that the Legendre symbol of each base number $g_i$ (for $i=1 \ldots, m$) with respect to p is equal to +1,
- the integer t is computed which is such that (p−1) is divisible by $2^t$, but not by $2^{t+1}$,
- the integer $s=(p-1+2^t)/2^{t+1}$ is computed,
- an integer $b \equiv h^{p-1/2^t} \bmod p$, where h is a non-quadratic residue of the body of integers modulo p, is computed,
- the m integers $r_i \equiv g_i^{2s} \bmod p$ for $i=1 \ldots, m$ are computed,
- an integer u is initialized to u=0,
- the following sequence of steps, where i is initialized to 1, is iteratively implemented:
  - an integer w is initialized to $w=r^i$,
  - if $r_i = \pm g_i$, the value of i is incremented and a sequence of steps with the new value of i is proceeded to if i<m, whereas the candidate prime number p is accepted as a factor of the modulus n if i=m,
  - if $r_i \neq \pm g_i$:
    - an integer jj is initialized to 1,
    - the following sequence of steps, where an integer ii is initialized to 1, is iteratively implemented:
      - $x \equiv w^2/g_i^2 \bmod p$ is computed,
      - $y \equiv x^2 \bmod p$ is computed, and
        - if y=+1, the sequence is terminated at the current value of ii,
        - if y=−1, jj is assigned the value $jj=2^{ii}$, the number w is assigned a new value equal to the old value multiplied by $b^{jj}$ modulo p, and
          - for ii<−2, the value of ii is incremented and a new iteration is proceeded to with the new value of ii,
          - for ii=t−2, the value of number u is updated through the relation $jj=2^{t-ii}$, and
    - if t−u<k, the candidate prime number p is rejected as a factor of the modulus n,
    - if t−u>k, the value of i is incremented and a sequence of steps with the new value of i is proceeded to if i<m, whereas the candidate prime number p is accepted as a factor of the modulus n if i=m.

8. The computer-readable storage medium storing instructions according to claim 7, wherein, to compute f.m private components $Q_{i,j}$ of the private values $Q_1, Q_2, \ldots, Q_m$, the following steps are implemented for each couple (i, j):
- an integer t is determined, which is equal to 1 if $p_j$ is congruent to 3 mod 4, and to the value obtained for t according to claim 7 if $p_j$ is congruent to 1 mod 4,
- an integer u is determined, which is equal to 0 if $p_j$ is congruent to 3 mod 4, and to the value obtained for u according to claim 7 if $p_j$ is congruent to 1 mod 4,
- the integer $z \equiv G_i^j \bmod p_j$ is computed, where $s=(p-1+2^t)/2^{t+1}$,
- all the numbers zz are being considered, which:
  - if u=0, are such that zz=z or such that zz is equal to the product modulo $p_j$ of z by each of the $2^{ii-1}$ $2^{ii}$-th primitive roots of unity, for ii ranging from 1 to min(k,t),
  - if u>0, arc such that zz is equal to the product modulo $p_j$ of za by each of the $2^k$ $2^k$-th roots of unity, where za is the value obtained for w according to claim 7, and
- for each such number zz, a value for the component $Q_{i,j}$ is obtained by taking $Q_{i,j}$ equal to zz if the equation $G_i \equiv Q_i^v$ mod n is used, or to the inverse of zz modulo $p_j$ if $G_i \cdot Q_i^v \equiv 1$ mod n is used for this value of i.

9. A computer-implemented process for producing asymmetric cryptographic keys, said keys comprising $m \geq 1$ private values $Q_1, Q_2, \ldots, Q_m$, and m respective public values $G_1, G_2, \ldots, G_m$, the computer-implemented process comprising:

selecting a security parameter k, wherein k is an integer greater than 1;

determining a modulus n, wherein n is a public integer equal to the product of at least two prime factors $p_1, \ldots, p_f$, at least two of these prime factors, say $p_1$ and $p_2$, being such that $p_1 \equiv 3$ mod 4 and $p_2 \equiv 3$ mod 4;

selecting m base numbers $g_1, g_2, \ldots, g_m$, wherein each base number $g_i$ (for $i=1, \ldots, m$) is an integer greater than 1 and is a non-quadratic residue of the ring of integers modulo n, and such that $p_2$ is complementary to $p_1$ with respect to one of the base numbers;

calculating the public values $G_i$ for $i=1, \ldots, m$ through $G_i \equiv g_i^2$ mod n; and calculating the private values $Q_i$ for $i=1, \ldots, m$ by solving either the equation $G_i \cdot Q_i^v \equiv 1$ mod n or the equation $G_i \equiv Q_i^v$ mod n, wherein the public exponent v is such that $v = 2^k$.

10. The computer-implemented process according to claim 9, wherein a number (f−e) (where $e \geq 0$) of prime factors of the modulus n which are congruent to 3 mod 4 is larger than 2, and those prime factors $p_{j+1}$, for $2 \leq j \leq m$ which are congruent to 3 mod 4 arc determined iteratively as follows.

the profile profile$_j$ ($g_j$) of $g_j$ with respect to the prime factors $p_1, p_2, \ldots, p_j$ is computed, and if profile$_j$($g_j$) is flat, then the prime factor $p_{j+1}$ is chosen such that $p_{j+1}$ is complementary to $p_i$ with respect to $g_j$; else, a number g is chosen among the (j−1) base numbers $g_1, g_2, \ldots, g_{j-1}$ and all of their multiplicative combinations, such that profile$_j$(g)=profile$_j$($g_j$), then $p_{j+1}$ is chosen such that profile$_{j+1}$($g_j$)≠profile$_{j+1}$(g), wherein the last prime factor $p_{f-e}$ congruent to 3 mod 4 is, in the case that $f-e \leq m$, chosen such that $p_{f-e}$ is complementary to $p_1$ with respect to all of the base numbers $g_j$ such that $f-e \leq i \leq m$ and whose profile profile$_{f-e-1}$($g_i$) is flat.

11. The computer-implemented process according to claim 9, wherein a number e of prime factors of the modulus n which are congruent to 1 mod 4 is at least equal to 1, and each such prime factor is determined as follows:

a candidate prime number p is chosen, such that the Legendre symbol of each base number $g_i$ (for $i=1, \ldots, m$) with respect to p is equal to +1, the integer t is computed which is such that (p−1) is divisible by $2^t$, but not by $2^{t+1}$, the integer $s=(p-1+2^t)/2^{t+1}$ is computed, an integer $b \equiv h^{p-1/2^t}$ mod p, where h is a non-quadratic residue of the body of integers modulo p, is computed, the m integers $r_i \equiv g_i^{2s}$ mod p for $i=1, \ldots, m$ arc computed, an integer u is initialized to $u=0$, the following sequence of steps, where i is initialized to 1, is iteratively implemented:

an integer w is initialized to $w=r_i$, if $r_i = \pm g_i$, the value of i is incremented and a sequence of steps with the new value of i is proceeded to if $i<m$, whereas the candidate prime number p is accepted as a factor of the modulus n if $i=m$, if $r_i \neq \pm g_i$:

an integer jj is initialized to 1, the following sequence of steps, where an integer ii is initialized to 1, is iteratively implemented $x \equiv w^2/g_i^2$ mod p is computed, $y \equiv x^2$ mod p is computed, and if $y=+1$, the sequence is terminated at the current value of ii, if $y=-1$, jj is assigned the value $jj=2^{ii}$, the number w is assigned a new value equal to the old value multiplied by $b^{jj}$ modulo p, and for $ii<t-2$, the value of ii is incremented and a new iteration is proceeded to with the new value of ii, for $ii=t-2$, the value of number u is updated through the relation $jj=2^{t-u}$, and if $t-u<k$, the candidate prime number p is rejected as a factor of the modulus n, if $t-u>k$, the value of i is incremented and a sequence of steps with the new value of i is proceeded to if $i<m$, whereas the candidate prime number p is accepted as a factor of the modulus n if $i=m$.

12. The computer-implemented process according to claim 11, wherein, to compute f.m private components $Q_{i,j}$ of the private values $Q_1, Q_2, \ldots, Q_m$, the following steps are implemented for each couple (i, j):

an integer t is determined, which is equal to 1 if $p_j$ is congruent to 3 mod 4, and to the value obtained for t according to claim 11 if $p_j$ is congruent to 1 mod 4, an integer u is determined, which is equal to 0 if $p_j$ is congruent to 3 mod 4, and to the value obtained for u according to claim 11 if $p_j$ is congruent to 1 mod 4, the integer $z \equiv G_i^s$ mod $p_j$ is computed, where $s=(p-1+2^t)/2^{t+1}$, all the numbers zz are being considered, which:

if $u=0$, are such that $zz=z$ or such that zz is equal to the product modulo $p_j$ of z by each of the $2^{ii-t}$ $2^{ii}$-th primitive roots of unity, for ii ranging from 1 to min(k,t), if $u>0$, are such that zz is equal to the product modulo $p_j$ of za by each of the $2^k$ $2^k$-th roots of unity, where za is the value obtained for w according to claim 11, and for each such number zz, a value for the component $Q_{i,j}$ is obtained by taking $Q_{i,j}$ equal to zz if the equation $G_i \equiv Q_i^v$ mod n is used, or to the inverse of zz modulo $p_j$ if $G_i \cdot Q_i^v \equiv 1$ mod n is used for this value of i.

* * * * *